(12) United States Patent
Gu et al.

(10) Patent No.: US 11,183,864 B2
(45) Date of Patent: Nov. 23, 2021

(54) MULTIMODE BATTERY CHARGING

(71) Applicant: Apple Inc., Cupertino, CA (US)

(72) Inventors: Bin Gu, Sunnyvale, CA (US);
Yongxuan Hu, San Jose, CA (US);
Stephen C. Terry, San Jose, CA (US);
Di Zhao, Santa Clara, CA (US); Ruchi J. Parikh, Sunnyvale, CA (US);
Michael D. Black, Cypress, CA (US);
Weiyun Chen, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 417 days.

(21) Appl. No.: 16/125,611

(22) Filed: Sep. 7, 2018

(65) Prior Publication Data

US 2019/0341796 A1 Nov. 7, 2019

Related U.S. Application Data

(60) Provisional application No. 62/667,896, filed on May 7, 2018.

(51) Int. Cl.
*H02J 7/02* (2016.01)
*H02J 7/00* (2006.01)
*H02J 50/10* (2016.01)

(52) U.S. Cl.
CPC ............... *H02J 7/025* (2013.01); *H02J 7/00* (2013.01); *H02J 7/0045* (2013.01); *H02J 50/10* (2016.02)

(58) Field of Classification Search
CPC ....................................................... H02J 7/025

USPC .......................................................... 320/108
See application file for complete search history.

(56) References Cited

U.S. PATENT DOCUMENTS

| 7,548,040 | B2 | 6/2009 | Lee |
| 10,106,046 | B2 | 10/2018 | Boys |
| 2011/0221390 | A1 | 9/2011 | Won et al. |
| 2011/0260681 | A1 | 10/2011 | Guccione et al. |
| 2013/0043833 | A1* | 2/2013 | Katz ................. H02J 50/70 320/108 |
| 2014/0203661 | A1* | 7/2014 | Dayan ................. H02J 7/025 307/104 |
| 2015/0028800 | A1 | 1/2015 | Kim |
| 2015/0364943 | A1* | 12/2015 | Vick ................. H02J 50/10 320/108 |
| 2016/0094076 | A1 | 3/2016 | Kasar |
| 2018/0131847 | A1* | 5/2018 | Kokonaski ......... H04N 5/23241 |
| 2019/0199140 | A1* | 6/2019 | Wu ................. H02J 50/80 |

OTHER PUBLICATIONS

International Search Report and Written Opinion dated Aug. 9, 2019 in PCT/US2019/030857, 19 pages.

* cited by examiner

*Primary Examiner* — Jerry D Robbins
(74) *Attorney, Agent, or Firm* — Kilpatrick Townsend & Stockton, LLP

(57) ABSTRACT

An electronic device may receive or provide power using bidirectional wired and wireless power converters. A bypass path may be included to bypass the battery charger and to allow direct power transfers from a connector of the electronic device to the wireless power converter or from the wireless power converter to the connector of the electronic device. Current limiting and regulation circuitry may also be included.

19 Claims, 21 Drawing Sheets

MULTIMODE BATTERY CHARGING

CROSS-REFERENCES TO RELATED APPLICATIONS

This application is a nonprovisional of United States provisional patent application No. 62/667,896, filed May 7, 2018, which is incorporated by reference.

BACKGROUND

Battery powered electronic devices may include rechargeable batteries. These battery powered electronic devices may also include power converters that receive power from external sources and in turn provide power to internal circuitry. These external sources may be chargers or other types of electronic devices. Many of these battery powered electronic devices need to be charged on a regular basis. Accordingly, what is needed are battery powered electronic devices that have an increased flexibility as to how they may be charged.

SUMMARY

Accordingly, embodiments of the present invention may provide charging circuitry for electronic devices, where the charging circuitry provides increased flexibility in charging the electronic devices. An illustrative embodiment of the present invention may include both a battery charger and a wireless power converter. The battery charger may include one or more buck or boost converters, though other types of power converters may be included as well. The battery charger may receive a voltage from an external source via a connector of the electronic device and use the received power to charge a battery and to supply power to circuitry in the electronic device. The external source may be a charger, host device, or other electronic device. The wireless power converter may receive wireless power from a wireless charger or other accessory device. The wireless power converter may include a rectifier to convert received inductive power to DC power, and then use the DC power to charge the battery and to supply power to system circuitry in the electronic device.

In these and other embodiments of the present invention, one or both of these wired and wireless power converters may be bidirectional circuits. That is, the battery charger may receive or provide wired power, while the wireless power converter may receive or provide wireless power. For example, the battery charger may receive a voltage from an external source via a connector and use the received power to charge a battery and to supply power to system circuitry in the electronic device. The battery charger may alternatively receive power from the battery and provide power to the connector of the electronic device. The wireless power converter may receive wireless power from a charger or other accessory device, convert the received wireless power to DC power, and then use the DC power to charge the battery and to supply power to circuitry in the electronic device. The wireless power converter may instead receive DC power from the battery, convert the DC power from the battery to wireless power, and transmit wireless power to an accessory device. The wireless power converter may include one or more driver stages to transmit the wireless power. In these and other embodiments of the present invention, the driver stages used to transmit power may operate as a rectifier when receiving wireless power.

In these and other embodiments of the present invention, power may be provided directly from the connector of the electronic device to the wireless power converter. Accordingly, embodiments of the present invention may include a bypass path. The bypass path may receive power from the connector of the electronic device and provide it to the pair of drivers in the wireless power converter, where the wireless power converter converts the power received from the connector and wirelessly provides it to an accessory device. This is particularly useful when a relatively high voltage, for example 9 or 15 volts, is received at the connector of the electronic device.

In these and other embodiments of the present invention, power may be provided directly from the wireless power converter to the connector of the electronic device. Accordingly, the bypass path may be a bidirectional path. Power received at the rectifier in the wireless power converter may be directly provided to the connector of the electronic device. This power may then be provided to an external device, such as a host or other electronic device.

In these and other embodiments of the present invention, power may be transferred among two or more devices, including an electronic device, in a highly flexible manner. In a first example, power may be received from a connector in an electronic device and used to charge a battery and provide power to circuitry in the electronic device (referred to as the system herein) and to further provide wireless power to an accessory. Specifically, power may be received at a connector of the electronic device from a host or other electronic device. This power may be received by a buck or other power converter in the battery charger. Some of this power may be provided to the battery and system, while the remainder may be provided to a boost converter in the battery charger, which may then provide power to the wireless power converter. One or more drivers in the wireless power converter may generate an alternating current through a first wireless power transmission coil. This wireless power may be received by a second wireless power transmission coil in an accessory. A rectifier across the second wireless power transmission coil in the accessory may receive the wireless power, convert the wireless power, and provide power to the accessory.

In a second example, wireless power may be received by an electronic device from an accessory and used to charge a battery and provide power to the system in the electronic device. Specifically, power may be provided by one or more drivers in an accessory, which may generate an alternating current through a first wireless power transmission coil. This wireless power may be received by a second wireless power transmission coil in the electronic device. A rectifier in the wireless power converter may receive the wireless power and provide power to a buck converter in a battery charger. The buck converter may provide power to the battery and the system.

In a third example, power may be received from a host or other electronic device or charger, and used to charge a battery and power the system in an electronic device. Specifically, power may be received at a connector of the electronic device from a host or other electronic device or charger. This power may be received by a buck or other power converter in the battery charger. More specifically, in these and other embodiments of the present invention, the battery charger may include a two-phase buck or other type of converter, and this buck or other converter may convert the received power and provide it to the battery and system for a fast charging.

In a fourth example, power may be provided by a battery of an electronic device and used to provide wireless power to an accessory. Specifically, power may be received from the battery by a boost or other converter in the battery charger. The boost converter may provide power to a wireless power converter. One or more drivers in the wireless power converter may generate an alternating current through a first wireless power transmission coil. This wireless power may be received by a second wireless power transmission coil in an accessory. A rectifier across the wireless power transmission coil in the accessory may receive the wireless power and provide power to the accessory.

In a fifth example, power received at a connector of an electronic device may be used to provide power to a battery and system of the electronic device. Power may also be provided wirelessly from the electronic device to an accessory. Specifically, power may be received at a connector of the electronic device from a host or other electronic device or charger. This power may be provided to a two-phase buck or other power converter in the battery charger. The output power from the buck converter may be provided to the battery and system. Power from the connector may also be provided to a wireless power converter. This power may be provided to the wireless power converter directly through a bypass path that connects the connector of the electronic device to the wireless power converter. One or more drivers in the wireless power converter may generate an alternating current through a first wireless power transmission coil. This wireless power may be received by a second wireless power transmission coil in an accessory. A rectifier across the coil may receive the wireless power and provide power to the accessory.

In a sixth example, both wired and wireless power may be received by an electronic device and used to charge a battery and provide power to the system of the electronic device. Specifically, power may be received at a connector of the electronic device from another electronic device or charger device. This power may be received by a buck or other power converter in the battery charger. The output power of the buck converter may be provided to the battery and system. At the same time, power may be provided by one or more drivers in an accessory, which may generate an alternating current through a first wireless power transmission coil. This wireless power may be received by a second wireless power transmission coil in the electronic device. A rectifier in the wireless power converter may receive the wireless power and provide power a second buck converter, which may also provide power to the battery and the system. This combined current from wired and wireless sources may speed the rate of charging of the battery.

In a seventh example, wireless power may be received from an accessory and wired power may be provided via a connector of an electronic device. Specifically, power may be provided by one or more drivers in a first accessory, which may generate an alternating current through a first wireless power transmission coil. This wireless power may be received by a second wireless power transmission coil in the electronic device. A rectifier in the wireless power converter may receive the wireless power and provide this power to a buck converter in a battery charger. The output of the buck converter may be used to charge a battery and to provide power to the system of the electronic device. Power may also be received from the battery and provided to a boost converter in the battery charger. The output of the boost converter may provide power to a connector of the electronic device. Power may then be received from the connector of the electronic device by a second accessory.

These and other embodiments of the present invention may provide current limiting circuitry. For example, current in the battery charger may be monitored. When this current is excessive, the power path through the battery charger may be disabled. In these and other embodiments of the present invention, power transfer in the bypass path may be disabled when current in the battery charger is excessive. In these and other embodiments of the present invention, power in the wireless power converter may be disconnected when current in the wireless power converter is over an allowed portion of the current in the battery charger.

These and other embodiments of the present invention may provide current regulation circuitry. For example, in the first and fifth examples above, where power from the connector of the electronic device is provided to both the battery and the wireless power converter, power to either or both of the battery or wireless power converter may be regulated to ensure that the wireless power converter has sufficient current. In the seventh example above, where power from the wireless power converter is provided to both the battery and the connector of the electronic device, current to either or both the battery and the connector of the electronic device may be regulated to ensure that each has sufficient power. This regulation may be done in various ways. For example, the duty cycle of control signals at the gates of transistors in the various boost or buck circuits may be varied to effectively vary their impedance.

In these and other embodiments of the present invention, the current regulation may follow various procedures and policies. For example, a priority may be that the wireless power converter receive sufficient current to provide a certain number of watts of wireless power, that the system receive a certain amount of current, while a remainder may go to the battery.

These and other embodiments of the present invention may not support each and every one of the configurations disclosed herein. That is, these and other embodiments of the present invention may support a subset of the functions disclosed herein. Also, in these and other embodiments of the present invention, other power transfer configurations may be possible. For example, power may be provided from the battery to the connector of the electronic device through either or both battery charger and the bypass path. In another example, power may also be provided from the battery to both the connector and the wireless power converter of the electronic device.

The battery charger, wireless power converter, and bypass path may be configured for these various operations in different ways. For example, one or more connection or orientation detection contacts in the connector may be used to determine when an external host or other electronic device or charger is connected to the battery charger via the connector. These connection or orientation detection contacts may be coupled to circuitry (not shown) that may be used to determine whether a connected device should provide power to one or more of the system, battery, or wireless power converter, or whether the connected device should receive power from one or more of these sources. Circuitry connected to the wireless power converter may determine when an external accessory or charger is inductively connected to the wireless power converter. This circuitry may further determine whether an inductively connected device should provide power to one or more of the system, battery, or battery charger, or whether the inductively connected device should receive power from one or more of these sources. Circuitry connected to the bypass path may determine whether a power supply received at the connector is sufficient to directly power the wireless power converter and may connect these circuits accordingly. This circuitry may also determine whether the wireless power converter may directly provide power to the connector, and may connect these circuits accordingly.

These and other embodiments of the present invention may provide a battery charger having a number of converters For example, the battery charger may include a first buck converter to receive power from the connector and provide power to the battery and system. A second buck converter may be included to also receive power from the connector and provide power to the battery and system. A third buck converter may be included to receive power from the wireless power converter and provide power to the battery and system. A first boost converter may be included to receive power from the battery and provide power to the connector, while a second boost converter may be included to receive power from the battery and provide power to the wireless power converter. These and other embodiments of the present invention may simplify the circuitry of battery charger by reconfiguring some or all of these power converters in the various examples of power transfer configurations shown herein. These reconfigurations may be done by configuring switches and altering transistor drive voltages. For example, a first power converter may be coupled between the connector and battery. The first power converter may operate as a buck converter when providing power from the connector to the battery and system, and as a boost converter when providing power from the battery to the connector. The second power converter may operate as a buck converter when providing power from the connector to the battery and system, as a buck converter when providing power from the wireless power converter to the battery and system, and as a boost converter when providing power from the battery to the wireless power converter.

These and other embodiments of the present invention may provide a wireless power converter having one or more driving circuits for providing wireless power and a rectifier for receiving wireless power. These and other embodiments of the present invention may simplify the circuitry of the battery charger by using the driver circuits of the power transmitting circuit as the rectifier in the power receiving circuit.

These and other embodiments of the present invention may provide charging circuitry that may be located in various types of devices, such as portable computing devices, tablet computers, desktop computers, laptops, all-in-one computers, cellular phones, smart phones, media phones, storage devices, portable media players, wearable computing devices, navigation systems, monitors, power supplies, adapters, remote control devices, chargers, and other devices.

Various embodiments of the present invention may incorporate one or more of these and the other features described herein. A better understanding of the nature and advantages of the present invention may be gained by reference to the following detailed description and the accompanying drawings.

DESCRIPTION OF EXEMPLARY EMBODIMENTS

Figure 1:
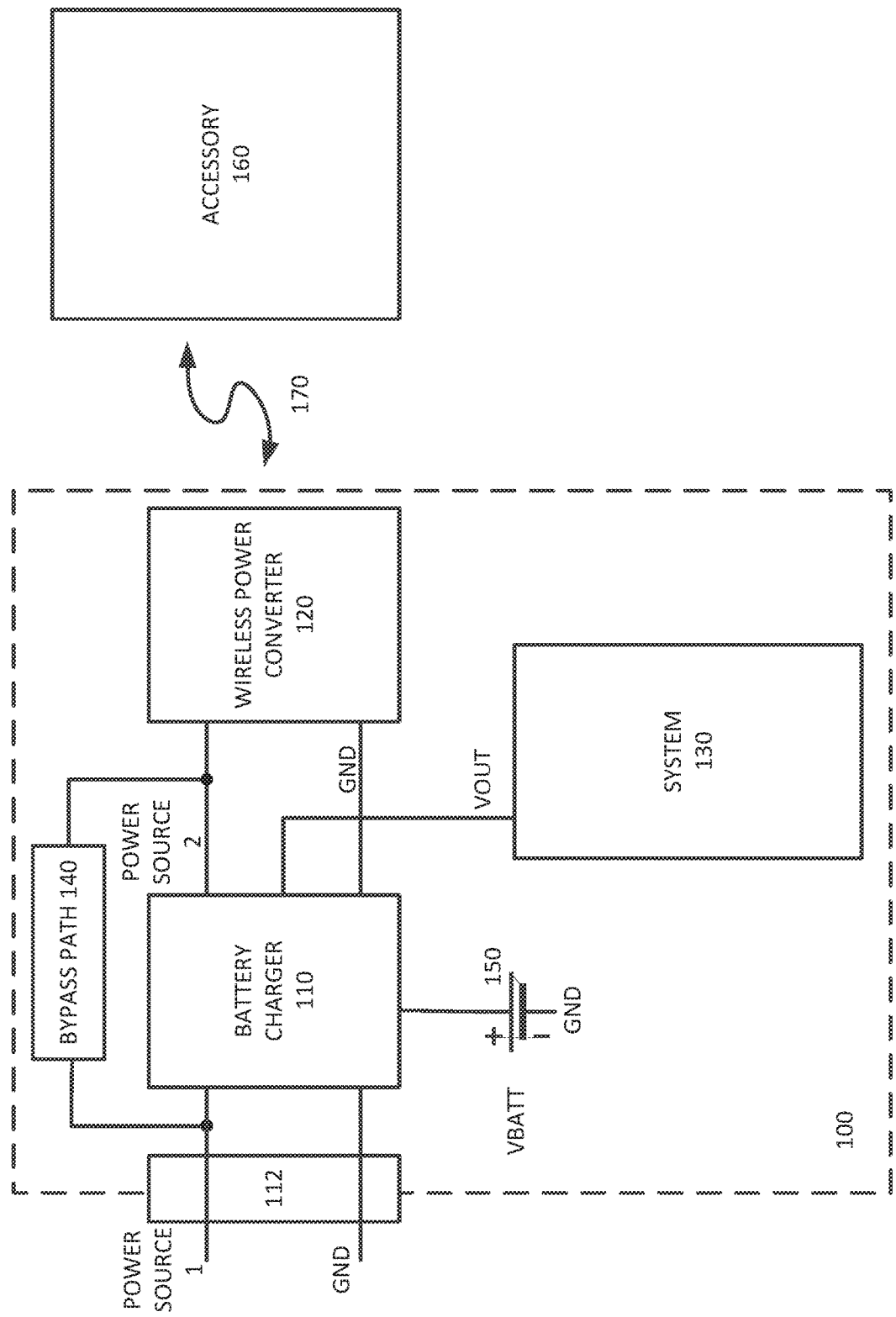
FIG. 1 illustrates an example of an electronic system according to an embodiment of the present invention.

FIG. 1 illustrates an example of an electronic system according to an embodiment of the present invention. This figure, as with the other included figures, is shown for illustrative purposes and does not limit other the possible embodiments of the present invention or the claims.

This figure includes electronic device 100. Electronic device 100 may include a connector 112 that may connect to and bidirectionally exchange wired power with an external charger, host device, or other type of electronic device. Battery charger 110 may provide or receive power from battery 150. Battery charger 110 may also supply power to system 130. System 130 may comprise some or all of the electronic circuitry of electronic device 100. Battery charger 110 may also bidirectionally exchange power with wireless power converter 120. Wireless power converter 120 may wirelessly and bidirectionally exchange power with accessory 160 via wireless path 170. Bypass path 140 may provide a bidirectional pathway around battery charger 110 from connector 112 to wireless power converter 120.

Connector 112 may include contacts for POWER SOURCE 1 and ground. Other contacts for other power supplies, signals, connection detection, orientation detection, bias lines, or other signals or voltages, may be included in connector 112. Connector 112 may be a universal serial bus (USB) Type C, other USB, lightning, thunderbolt, or other type of connector.

Battery charger 110, wireless power converter 120, and bypass path 140 may each be bidirectional circuits. This may allow power from either or both a device connected to connector 112 and accessory 160 to provide power to, or receive power from, electronic device 100. Examples of several possible power-sharing configurations are shown below.

Various circuits may be used for battery charger 110, wireless power converter 120, bypass path 140, and the wireless circuitry in accessory 160. Examples are shown in the following figures.

Figure 2:
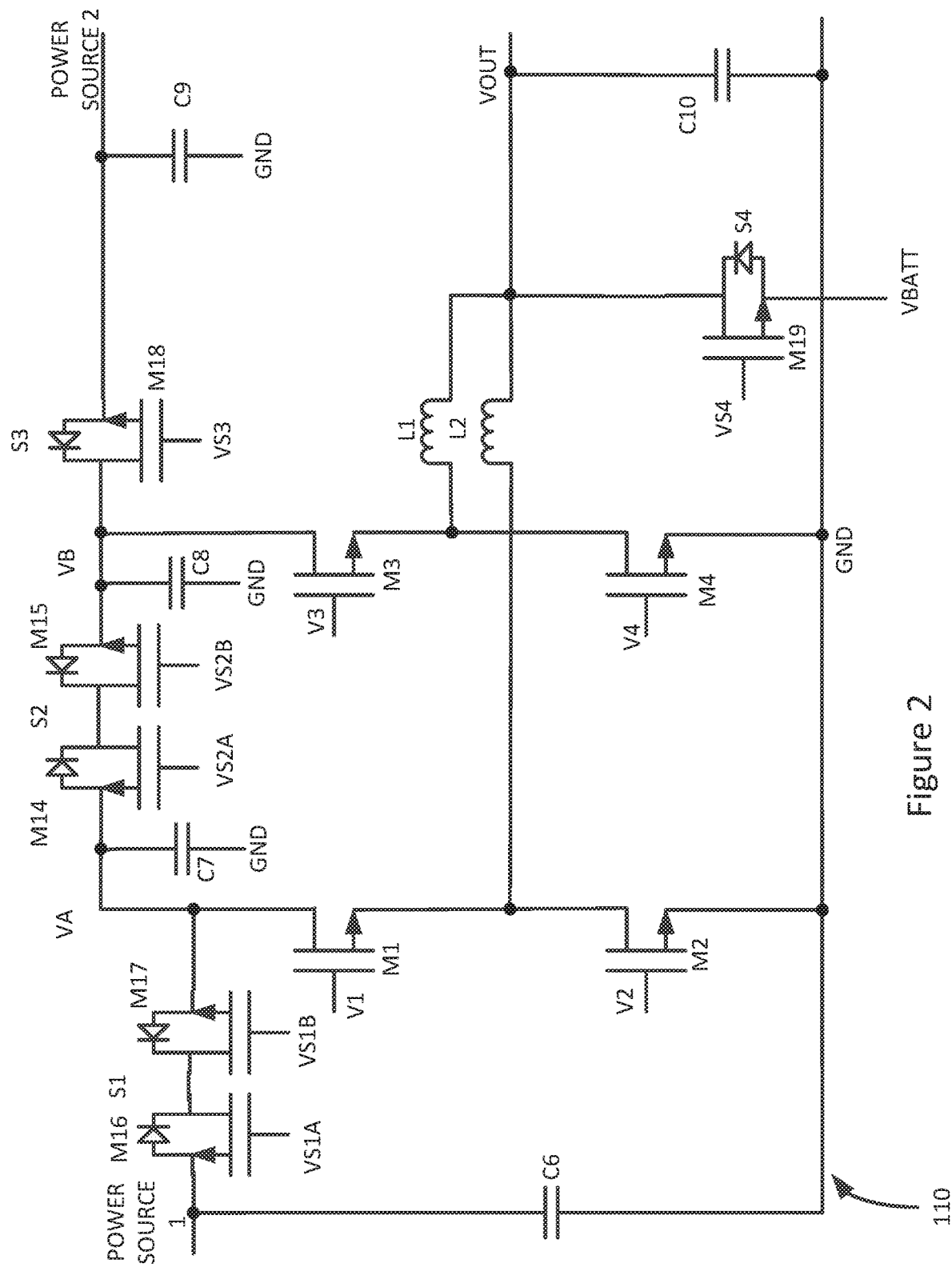
FIG. 2 illustrates an example of a battery charger and bypass path according to an embodiment of the present invention.

FIG. 2 illustrates a battery charger and bypass path according to an embodiment of the present invention. In this example, a power supply voltage at POWER SOURCE 1 may be received from a host or other electronic device or charger, or provided to a host or other electronic device, via connector 112 or other wired connection as shown in FIG. 1. Connector 112 may be a USB Type-C, USB Type-A, lightning, or other type of connector. In these and other embodiments of the present invention, the voltage at POWER SOURCE 1 may instead be received from, or provided to, a wireless power converter or other wireless power source or receiver. Switch S1, which may include transistors M16 and M17 in a back-to-back configuration, may selectively connect POWER SOURCE 1 to node VA and to power converter transistors M1 and M2. Power converter transistors M1 and M2 and inductor L2 may be used as a buck converter when providing power from POWER SOURCE 1 to battery 150 and system 130, and as a boost converter when providing power from battery 150 to node POWER SOURCE 1. In both of these configurations, switches S1 and S4 may be closed. Transistors M1-M2 may be driven at their gates by signals V1-V2. Signals V1-V2 may be non-overlapping pulse-width modulated signals which may generate currents in L2. Switch S2, which may include transistors M14 and M15 in a back-to-back configuration, may selectively couple the voltage on node VA to node VB and the power converter transistors M3 and M4. The power converter transistors M3 and M4 and inductor L1 may operate as a buck converter when providing power from connector 112 to battery 150 and system 130 (S1, S2, and S4 closed), as a buck converter when providing power from wireless power converter 120 to battery 150 and system 130 (S3 and S4 closed), and as a boost converter when providing power from battery 150 to wireless power converter 120 (S3 and S4 closed.) Transistors M3-M4 may be driven at their gates by signals V3-V4. Signals V3-V4 may be non-overlapping pulse-width modulated signals which may generate currents in inductor L1. The currents in L1 and L2 may generate the output voltage VOUT. The output voltage VOUT may be used to provide power to system 130, as shown in FIG. 1. Switch S4, which may include transistor M19, may selectively connect the output voltage VOUT to the battery at terminal VBATT. Switch S3, which may include transistor M18, may selectively connect the voltage at VB to POWER SOURCE 2, which may be received or provided by wireless power converter 120. In these and other embodiments of the present invention, POWER SOURCE 2 may instead receive power from, or provide power to, a connector such as a USB Type-C, USB Type-A, lightning, or other wired connection.

In this example, bypass path 140 may comprise switches S1, S2, and S3. These switches may be closed in order to provide power from POWER SOURCE 1 at connector 112 directly to POWER SOURCE 2, or from POWER SOURCE 2 directly to POWER SOURCE 1 at connector 112.

In these and other embodiments of the present invention, it may be undesirable to provide a current pathway directly from a first power source to a second power source. Accordingly, either or both of the switches S1 or S2 may include two transistors arranged to have back-to-back body diodes. These back-to-back body diodes may allow a switch to be configured with one transistor on and conducting, while a second transistor may be off and its body diode may be conducting. This may allow a switch to pass current in a forward direction and to prevent an undesirable reverse current flow. For example, it may be undesirable to provide a high voltage received on POWER SOURCE 2 from being provided to POWER SOURCE 1. Accordingly, in switch S2, transistor M14 may be off while transistor M15 is on. This may allow current to flow from POWER SOURCE 1 to POWER SOURCE 2, while not allowing current to flow from POWER SOURCE 2 to POWER SOURCE 1.

In these and other embodiments of the present invention, a battery charger may include current limiting circuitry. For example, current being provided to the output voltage VOUT may be monitored in one or more of the driver transistors M1-M4. When the monitored current is excessive, one or more of the switches S1, S2, S3, or S4, may be opened. In these and other embodiments of the present invention, transistors M1 and M2 may limit a current drawn from the host device through connector 112. Transistors M1 and M2 may be alternatively referred to as a charger and may be used to ensure that the current drawn does not exceed a specification, such as one of the Universal Serial Bus specifications.

In these and other embodiments of the present invention, a battery charger may include current regulating circuitry. For example, power may be received at POWER SOURCE 1 and provided both to the battery and to wireless power converter 120 via POWER SOURCE 2. In such a case, current in the various power converters may be monitored. Based on the monitored current, the impedance of one or more power converters may be varied by adjusting the duty cycles of their gate signals to ensure that wireless power converter 120 has sufficient current for proper operation.

In these examples, battery charger 110 may receive or provide power at nodes POWER SOURCE 1 and POWER SOURCE 2. Power at either or both of these nodes may be received from, or provided to, a wired connection, such as connector 112 of electronic device 100, or other wired connection. Power at either or both of these nodes may instead be received from, or provided to, a wireless source or receiver, such as wireless power converter 120 or other wireless source or receiver.

Figure 3:
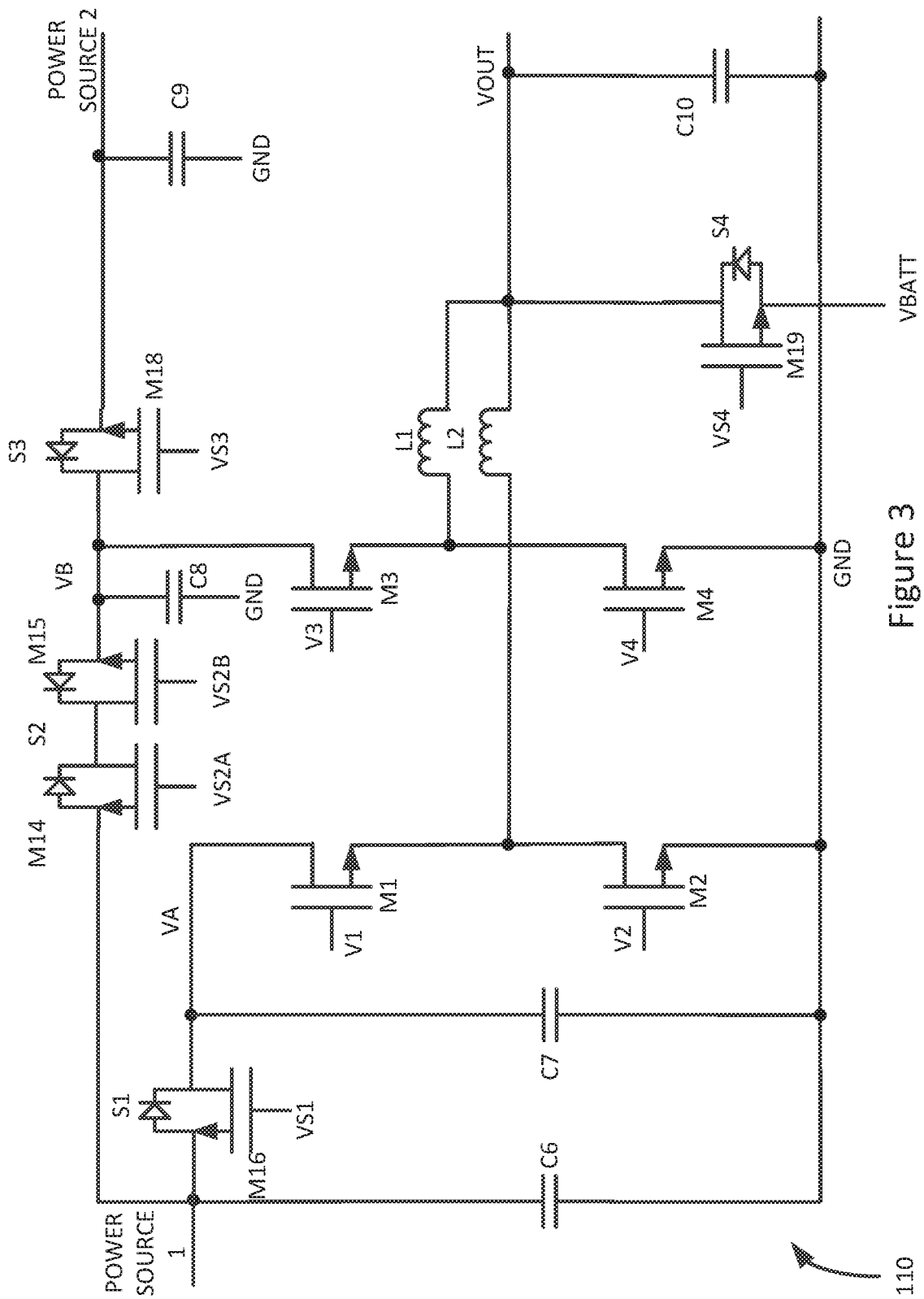
FIG. 3 illustrates another example of a battery charger and bypass path according to an embodiment of the present invention.

FIG. 3 illustrates another example of a battery charger and bypass path according to an embodiment of the present invention. In this example, a power supply voltage may be received at POWER SOURCE 1 from a host or other electronic device or charger, or provided to a host or other electronic device, via connector 112 or other wired connection as shown in FIG. 1. Connector 112 may be a USB Type-C, USB Type-A, lightning, or other type of connector. In these and other embodiments of the present invention, the voltage at POWER SOURCE 1 may instead be received from, or provided to, a wireless power converter or other wireless power source or receiver. Switch S1, which may include transistor M16, may selectively connect POWER SOURCE 1 to node VA and to power converter transistors M1 and M2. In this example, power converter transistors M1 and M2 and inductor L2 may be used as a buck converter when providing power from POWER SOURCE 1 to battery 150 and system 130, and as a boost converter when providing power from battery 150 to node POWER SOURCE 1. In both of these configurations, switches S1 and S4 may be closed. Transistors M1-M2 may be driven at their gates by signals V1-V2. Signals V1-V2 may be non-overlapping pulse-width modulated signals which may generate currents in L2. Switch S2, which may include transistors M14 and M15 connected in a back-to-back configuration, may selectively couple node POWER SOURCE 1 to node VB and the power converter transistors M3 and M4. The power converter transistors M3 and M4 and inductor L1 may operate as a buck converter when providing power from the connector to battery 150 and system 130 (S2 and S4 closed), as a buck converter when providing power from wireless power converter 120 to battery 150 and system 130 (S3 and S4 closed), and as a boost converter when providing power from battery 150 to wireless power converter 120 (S3 and S4 closed.) Transistors M3-M4 may be driven at their gates by signals V3-V4. Signals V3-V4 may be non-overlapping pulse-width modulated signals which may generate currents in inductor L1. The currents in inductors L1 and L2 may generate the output voltage VOUT. The output voltage VOUT may be used to provide power to system 130, as shown in FIG. 1. Switch S4, which may include transistor M19, may selectively connect the output voltage VOUT to the battery at terminal VBATT. Switch S3, which may include transistor M18, may selectively connect the voltage at VB to POWER SOURCE 2, which may be received from, or provided to, wireless power converter 120 or other wireless power source or receiver. In these and other embodiments of the present invention, POWER SOURCE 2 may instead receive power from, or provide power to, a connector, such as a USB Type-C, USB Type-A, lightning, or other wired connection.

In this example, bypass path 140 may comprise switches S2 and S3. These switches may be closed in order to provide power from POWER SOURCE 1 at connector 112 directly to POWER SOURCE 2, or from POWER SOURCE 2 directly to POWER SOURCE 1 at connector 112.

Again, it may be undesirable to provide a current pathway from a first power source to a second power source. Accordingly, one or more of the switches S2 and S4 may include two transistors arranged to have back-to-back body diodes. These back-to-back body diodes may allow a switch to be configured with one transistor to be on and conducting, while a second transistor may be off and its body diode may be conducting. This may allow a switch to pass current in a forward direction and to prevent an undesirable reverse current flow. For example, it may be undesirable to provide a high voltage received on POWER SOURCE 2 from being provided to POWER SOURCE 1. Accordingly, in switch S2, transistor M14 may be off while transistor M15 is on. This may allow current to flow from node POWER SOURCE 1 to POWER SOURCE 2, while not allowing current to flow from POWER SOURCE 2 to POWER SOURCE 1.

In these and other embodiments of the present invention of the present invention, a battery charger 110 may include current limiting circuitry. For example, current being provided to the output voltage VOUT may be monitored in one or more of the power converter transistors M1-M4. When the monitored current is excessive, one or more of the switches S1, S2, or S4, may be opened.

In these and other embodiments of the present invention, battery charger 110 may include current regulating circuitry. For example, power may be received at POWER SOURCE 1 and provided both to battery 150 and to wireless power converter 120 via POWER SOURCE 2. In such a case, current in any or all of the power converters may be monitored. Based on the monitored currents, the impedance of one or more power converters may be varied by adjusting the duty cycles of their gate signals to ensure that wireless power converter 120 has sufficient current for proper operation.

Figure 4:
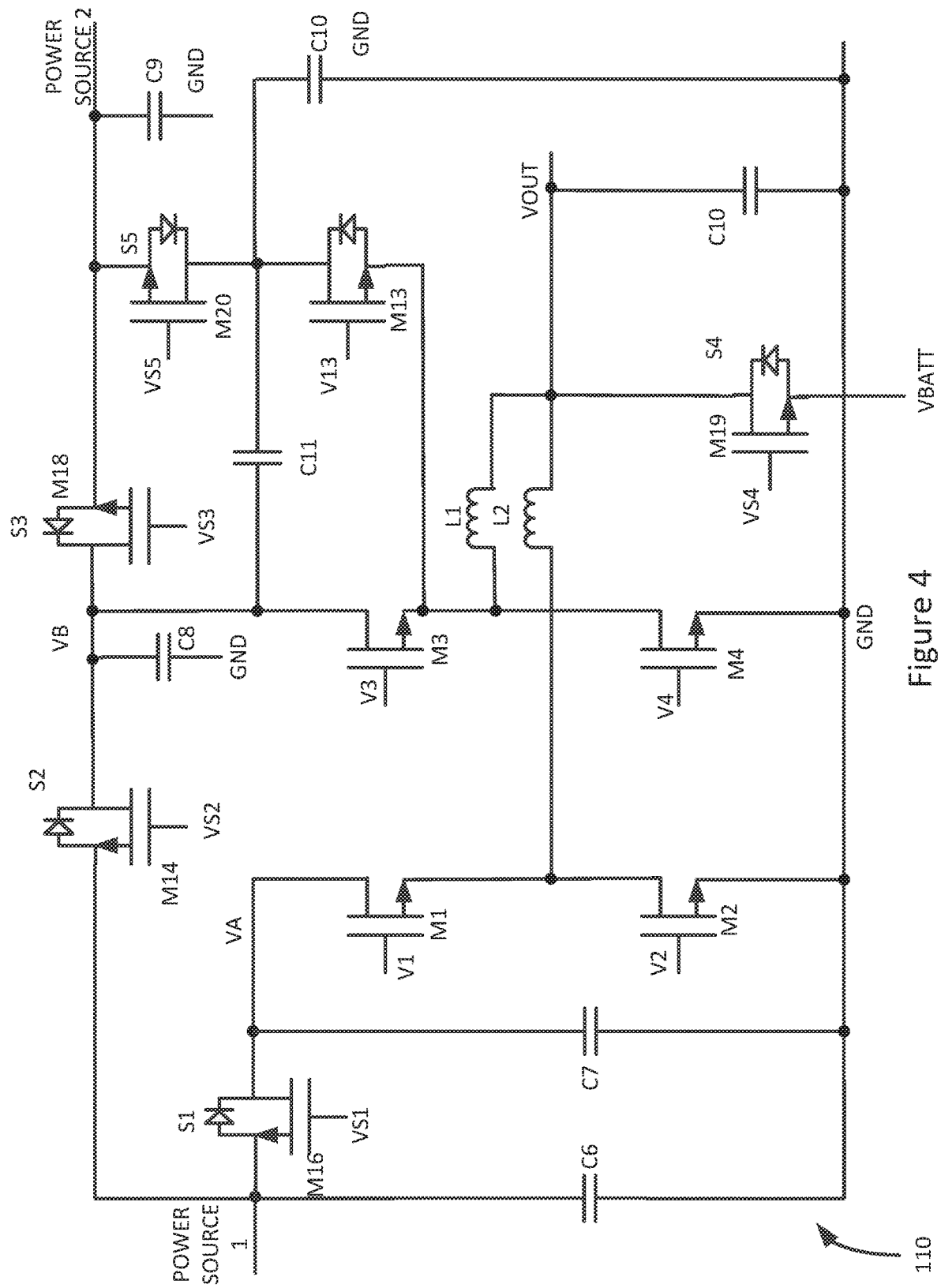
FIG. 4 illustrates another example of a battery charger and bypass path according to an embodiment of the present invention.

FIG. 4 illustrates another example of a battery charger and bypass path according to an embodiment of the present invention. In this example, a power supply voltage at POWER SOURCE 1 may be received from a host or other electronic device or charger, or provided to a host or other electronic device, via connector 112 or other wired connection as shown in FIG. 1. Connector 112 may be a USB Type-C, USB Type-A, lightning, or other type of connector. In these and other embodiments of the present invention, POWER SOURCE 1 may instead be received from, or provided to, a wireless power converter or other wireless power source or receiver. A boost converter (not shown) may be situated between connector 112 and battery charger 110. Switch S1, which may include transistor M16, may selectively connect POWER SOURCE 1 to node VA and to power converter transistors M1 and M2. In this example, power converter transistors M1 and M2 and inductor L2 may be used as a buck converter when providing power from POWER SOURCE 1 to battery 150 and system 130, and as a boost converter when providing power from battery 150 to POWER SOURCE 1. In both of these configurations, switches S1 and S4 may be closed. Transistors M1-M2 may be driven at their gates by signals V1-V2. Signals V1-V2 may be non-overlapping pulse-width modulated signals which may generate currents in L2. Switch S2, which may include transistor M14, may selectively couple node POWER SOURCE 1 to node VB and the power converter transistors M3 and M4. The power converter transistors M3 and M4 and inductor L1 may operate as a buck converter when providing power from the connector to battery 150 and system 130 (S2 and S4 closed). The power converter transistors M3 and M4 and inductor L1 may operate as a buck converter when providing power from wireless power converter 120 to battery 150 and system 130 (S5 and S4 closed), and as a boost converter when providing power from battery 150 to wireless power converter 120 (S5 and S4 closed.) Transistors M3-M4 may be driven at their gates by signals V3-V4. Signals V3-V4 may be non-overlapping pulse-width modulated signals which may generate currents in inductor L1. The currents in inductor L1 and L2 may generate the output voltage VOUT. The output voltage VOUT may be used to provide power to system 130, as shown in FIG. 1. Switch S4, which may include transistor M19, may selectively connect the output voltage VOUT to the battery at terminal VBATT. Switch S3, which may include transistor M18, may selectively connect the voltage at VB to POWER SOURCE 2, which may be received from or provided to wireless power converter 120. In these and other embodiments of the present invention, node POWER SOURCE 2 may instead receive power from, or provide power to, a connector, such as a USB Type-C, USB Type-A, lightning or other wired connection.

Switch S5, which may include transistor M20, may couple POWER SOURCE 2 to the power converter transistor M13. Power converter transistor M13 may be used with power converter transistor M4 to form a buck or a boost converter. In these and other embodiments of the present invention, both M13 and M3 may be used along with M4 to form a buck or a boost converter.

In this example, bypass path 140 may comprise switches S2 and S3. These switches may be closed in order to provide power from POWER SOURCE 1 at connector 112 directly to POWER SOURCE 2, or from POWER SOURCE 2 directly to POWER SOURCE 1 at connector 112.

Again, it may be undesirable to provide a current pathway from a first power source to a second power source. Accordingly, one or more of the switches S2 and S3 may be formed using two transistors arranged to have back-to-back body diodes. These back-to-back body diodes may allow a switch to be configured with one transistor to be on and conducting, while a second transistor may be off and its body diode may be conducting. This may allow a switch to pass current in a forward direction and to prevent an undesirable reverse current flow. For example, it may be undesirable to provide a high voltage received on POWER SOURCE 2 from being provided to POWER SOURCE 1. Accordingly, in switch S2, transistor M14 may be off while transistor M18 in switch S3 is on. This may allow current to flow from node POWER SOURCE 1 to POWER SOURCE 2, while not allowing current to flow from POWER SOURCE 2 to POWER SOURCE 1.

In these and other embodiments of the present invention of the present invention, battery charger 110 may include current limiting circuitry. For example, current being provided to the output voltage VOUT may be monitored in one or more of the power converter transistors M1-M4. When the monitored current is excessive, one or more of the switches S1, S2, or S4, may be opened.

In these and other embodiments of the present invention, a battery charger may include current regulating circuitry. For example, power may be received at POWER SOURCE 1 and provided both to battery 150 and to wireless power converter 120 via POWER SOURCE 2. In such a case, current in any or all of the power converters may be monitored. Based on the monitored currents, the impedance of one or more of the power converters may be varied by adjusting the duty cycles of their gate signals to ensure that wireless power converter 120 has sufficient current for proper operation.

In these and other embodiments of the present invention, the current regulation may follow various procedures and policies. For example, a priority may be that wireless power converter 120 receive sufficient current to provide a certain number of watts of wireless power, that a certain amount go to system 130, while a remainder may go to battery 150.

These and other embodiments of the present invention may provide wireless power converter 120 having one or more driving circuits for providing wireless power and a rectifier for receiving wireless power. These and other embodiments of the present invention may simplify the circuitry of the battery charger by using the output driver transistors of the power transmitting circuit as the rectifier in the power receiving circuit. An example is shown in the following figure.

Figure 5:
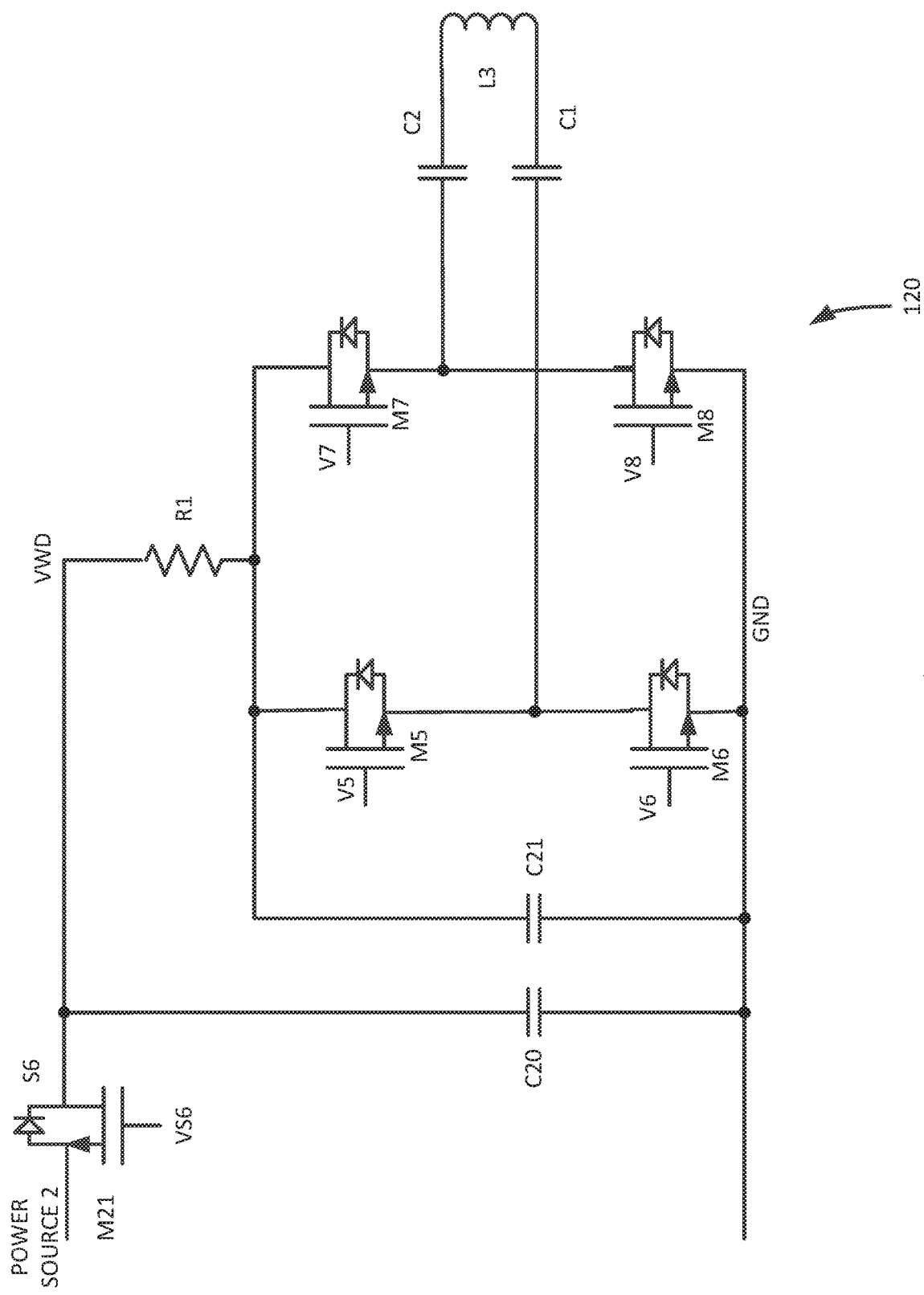
FIG. 5 illustrates an example of a wireless power converter cording to an embodiment of the present invention.

FIG. 5 illustrates an example of a wireless power converter according to an embodiment of the present invention. In this example, power may be received or provided on node POWER SOURCE 2 by closing switch S6, which may include transistor M21. Resistor R1 may be a series resistor used in monitoring current flow in this wireless power converter.

This circuitry may either provide or receive wireless power. This circuitry may provide power in a balanced or unbalanced mode of operation. In the balance mode of operation, output driver transistors M5-M8 may be driven by signals V5-V8 at their gates. Signals V5-V8 may be non-overlapping pulse-width modulated signals that may generate an alternating current in power transfer coil L3. Power transfer coil L3 may be AC coupled to output driver transistors M5-M8 via capacitor C1 and C2. In the unbalanced mode of operation, either pair of output driver transistors, M5 and M6, or M7 and M8, may be driven while the other pair may form a path to ground. For example, output drive transistors M5 and M6 may be driven by signals V5 and V6, which may be non-overlapping pulse-width modulated signals. Transistor M8 may be on to form a path to ground, while transistor M7 may be off. The output of output driver transistors M5 and M6 may drive power transfer coil L3 via capacitor C1.

While receiving wireless power, output driver transistors M5-M8 may be off and the gate signals V5-V8 may be low. The body diodes of transistors M5-M8 may form a diode rectifier that may receive a current induced in the power transfer coil L3 and generate a voltage VWD. Alternatively, transistors M5-M8 may operate as a synchronous rectifier. The gate signals V5-V8 may be based on currents sensed in transistors M5-M8 such that transistors M5-M8 operate in a reverse current conducting mode. Using transistors M5-M8 as a synchronous rectifier may eliminate the forward diode drop loss that may be incurred using the body diodes of transistors M5-M8 as a diode rectifier. In either mode, power may then be selectively coupled to line POWER SOURCE 2 through switch S6.

Figure 6:
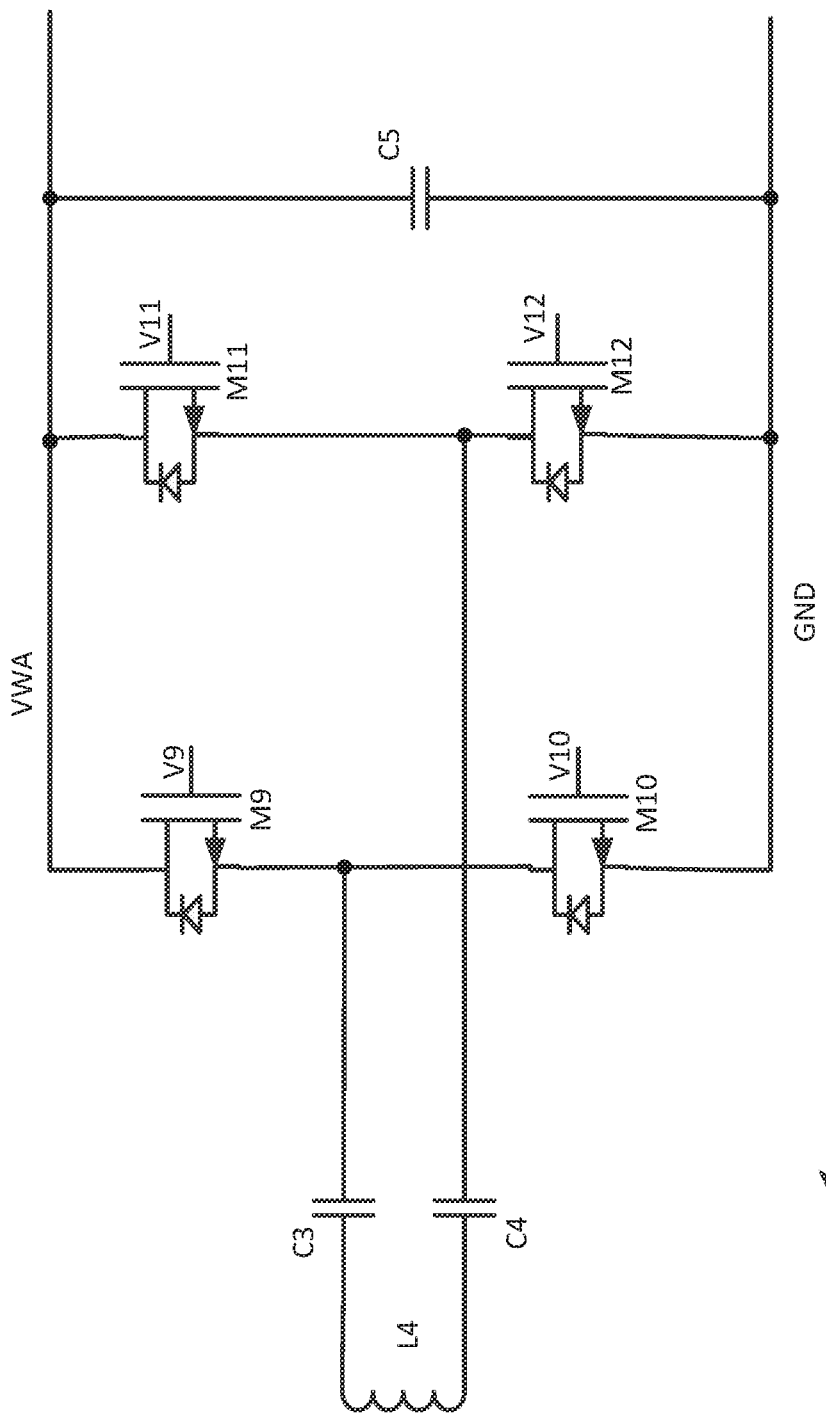
FIG. 6 illustrates an example of a wireless power converter for an accessory according to an embodiment of the present invention.

FIG. 6 illustrates an example of a wireless power converter for an accessory according to an embodiment of the present invention. This circuitry may either provide or receive wireless power. This circuitry may provide power in a balanced or unbalanced mode of operation. In the balance mode of operation, output driver transistors M9-M12 may be driven by signals V9-V12 at their gates. Signals V9-V12 may be non-overlapping pulse-width modulated signals that may generate an alternating current in power transfer coil L4. Power transfer coil L4 may be AC coupled to output driver transistors M9-M12 via capacitor C3 and C4. In the unbalanced mode of operation, either pair of output driver transistors, M9 and M10, or M11 and M12, may be driven while the other pair may form a path to ground. For example, output driver transistors M9 and M10 may be driven by signals V9 and V10, which may be non-overlapping pulse-width modulated signals. Transistor M12 may be on to form a path to ground, while transistor M11 may be off. The output of output driver transistors M9 and M10 may drive power transfer coil L4 via capacitor C3.

In these and other embodiments of the present invention, the currents in wireless power transfer coils L3 and L4 may alternate at a frequency of 100-200 kHz, though other frequencies, such as 6.78 MHz, may be used.

While receiving wireless power, driver transistors M9-M12 may be off and the gate signals V9-V12 may be low. The body diodes of transistors M9-M12 may form a rectifier that may receive a current induced in power transfer coil L4 and generate a voltage VWA. Alternatively, transistors M9-M12 may operate as a synchronous rectifier. The gate signals V9-V12 may be based on currents sensed in transistors M9-M12 such that transistors M9-M12 operate in a reverse current conducting mode. Using transistors M9-M12 as a synchronous rectifier may eliminate the forward diode drop loss that may be incurred using the body diodes of transistors M9-M12 as a diode rectifier. In either mode, the resulting voltage may then be used to power some or all of the remainder of accessory 160.

Figure 7:
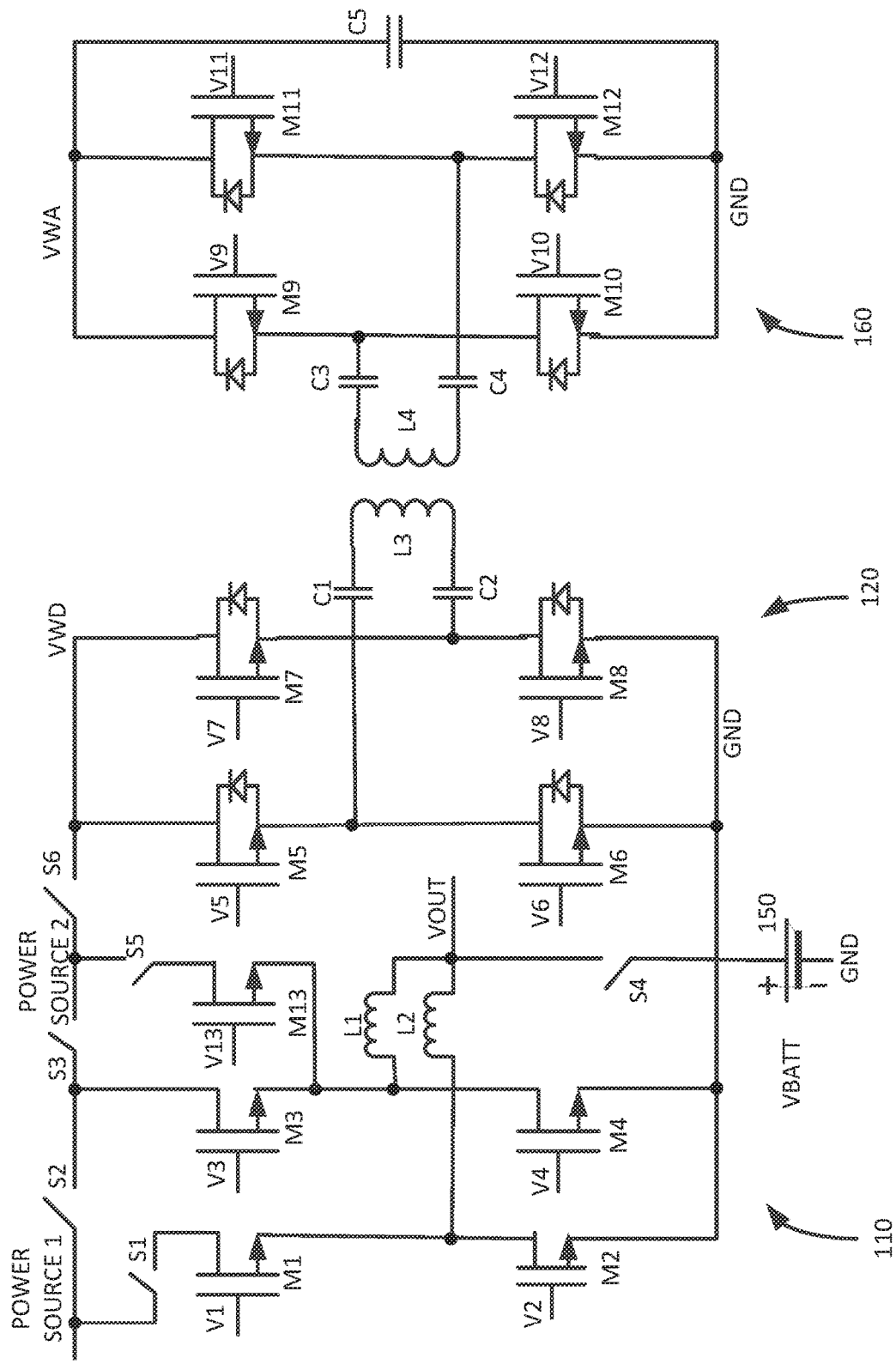
FIG. 7 is a simplified example of a power transfer system of an electronic device and an accessory according to an embodiment of the present invention.

FIG. 7 is a simplified example of a power transfer system of an electronic device and an accessory according to an embodiment of the present invention. In this figure, each of the switches are shown as being open to clarify their positions. Some of the bypass and the coupling capacitors shown in the above figures are omitted for clarity and simplicity. The switches in this and the following figures are simplified for clarity as well.

The circuitry provided by embodiments of the present invention may be highly flexible and may allow devices in an electronic system to transfer power in various ways. Examples are shown in the following figures. These examples are shown for illustrative purposes only and do not limit either the possible examples, the claims, or the possible embodiments of the present invention.

In a first example, power may be received from a connector in an electronic device and used to charge a battery in the electronic device and to further provide power to an accessory. Specifically, power may be received at a connector of the electronic device from a host or other electronic device or charger. This power may be received by a buck or other power converter in the battery charger. Some of this power may be provided to the battery and system (the circuitry in the electronic device), while the remainder may be provided to a boost converter in the battery charger, which may then provide power to the wireless power converter. One or more drivers in the wireless power converter may generate an alternating current through a first wireless power transmission coil. This wireless power may be received by a second wireless power transmission coil in an accessory. A rectifier across the wireless power transmission coil in the accessory may receive the wireless power and provide power to the accessory.

Figure 8:
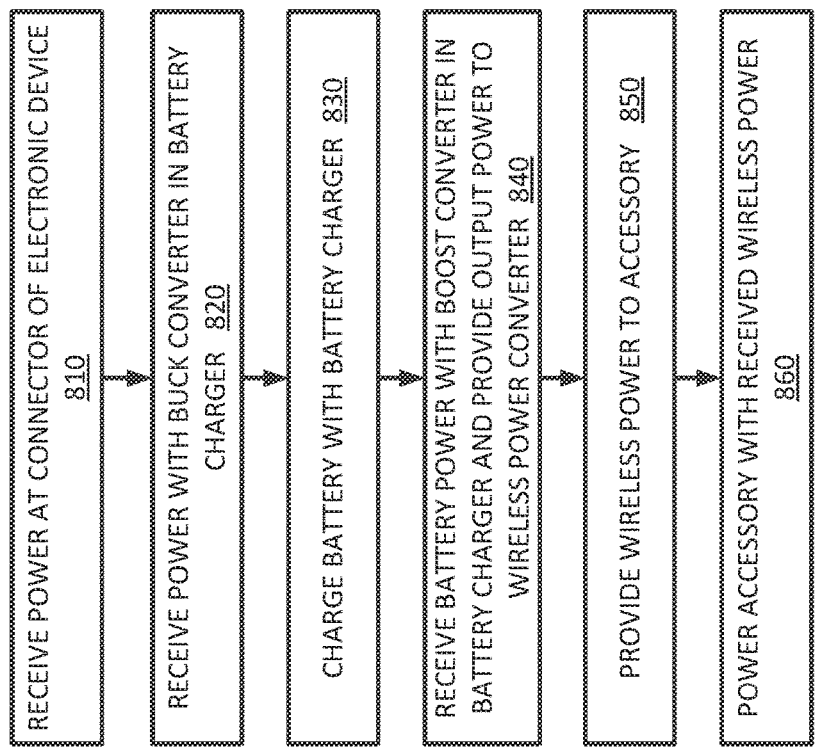
FIG. 8 is a flow chart showing a first example of power transfer according to an embodiment of the present invention.

FIG. 8 is a flow chart showing the first example of power transfer according to an embodiment of the present invention. In act 810, power may be received at a connector of an electronic device. This power may be received by a buck converter of the battery charger in act 820. The output power may be used to charge a battery in the electronic device in act 830. Power from the battery may be received by a boost converter in the battery charger, which may provide power to a wireless power converter in the electronic device in act 840. In act 850, wireless power may be provided to an accessory using the wireless power converter. The accessory may be powered by the received power in act 860.

Figure 9:
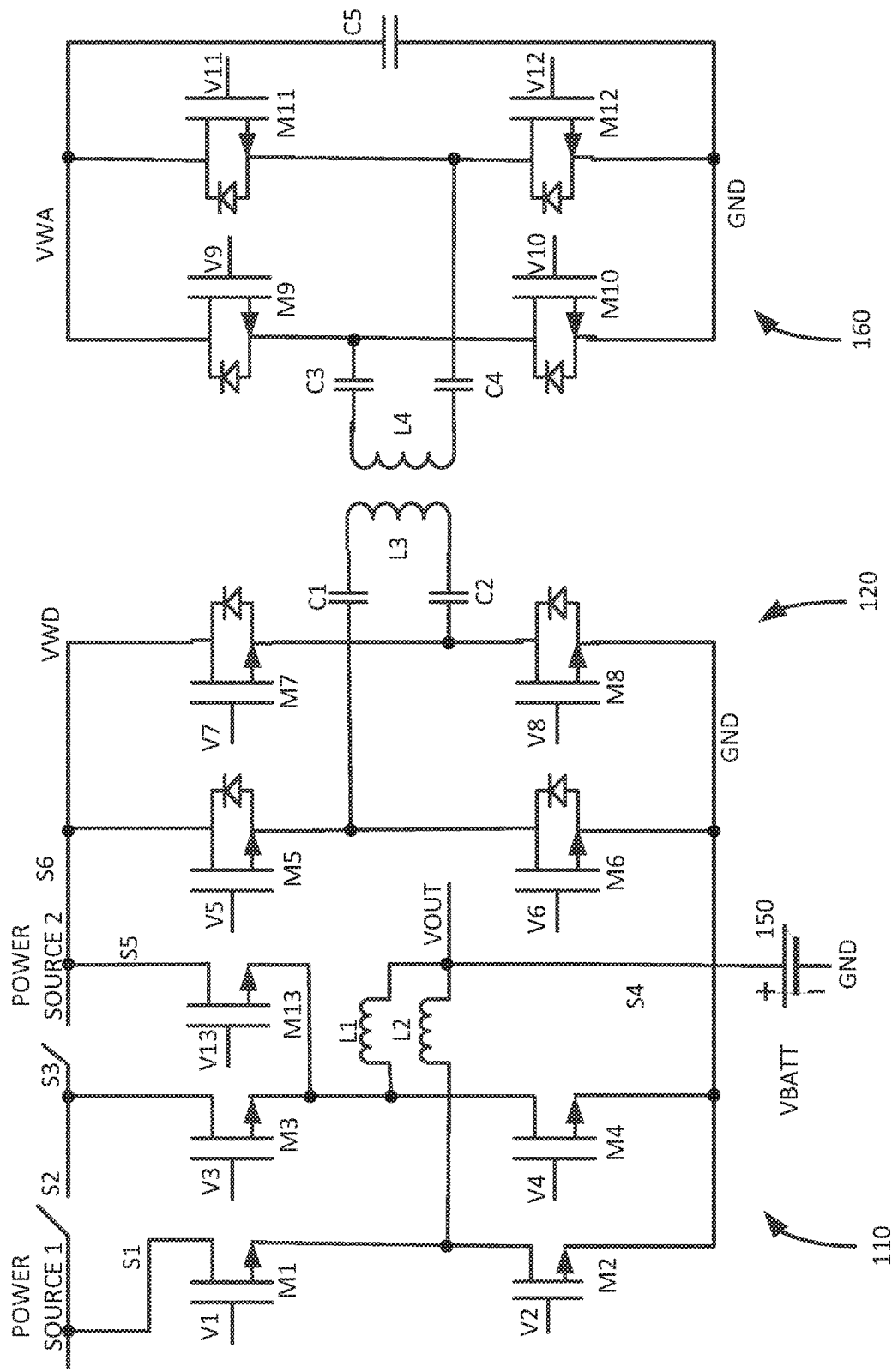
FIG. 9 is a simplified schematic of a power transfer system configured for the first example according to an embodiment of the present invention.

FIG. 9 is a simplified schematic of a power transfer system configured for the first example according to an embodiment of the present invention. Again in these examples, the decoupling and bypass capacitors have been omitted and switches have been simplified for clarity. In this configuration, power may be received at POWER SOURCE 1, which may be connected to a pin or contact of a connector 112 or other wired connection of electronic device 100 as shown in FIG. 1. Connector 112 may be a USB Type-C, USB Type-A, lightning, or other type of connector. Power at connector 112 may be received from a host device, charger, or other electronic device. In these and other embodiments of the present invention, the voltage on POWER SOURCE 1 may instead be received from a wireless power converter or other wireless power source. In this particular example, the voltage on POWER SOURCE 1 may be relatively low, for example 5 V. Accordingly, this power may be boosted by a power converter (not shown), which may provide power to buck converter transistors M1 and M2 via switch S1. Signals V1 and V2 at the gates of transistors M1 and M2 may be non-overlapping pulse-width modulated signals to generate currents in inductor L2, though transistor M2 may be off. The output voltage VOUT may be used to power system 130 as shown in FIG. 1. The output voltage VOUT may also be provided through a boost converter comprising inductor L1 and transistors M13 and M4 in battery charger 110. Signals V4 and V13 at the gates of transistors M4 and M13 may be non-overlapping pulse-width modulated signals to generate currents in inductor L1, though transistor M13 may be off. Transistor M3 may also be off, though M3 may be configured to operate the same as M13 and switch S3 may be closed. The boost converter may provide power through switch S5 to node POWER SOURCE 2. POWER SOURCE 2 may power wireless power converter 120, though in these and other embodiments of the present invention, POWER SOURCE 2 may instead provide power to a connector, such as a USB Type-C, USB Type-A, lightning, or other wired connection. The output driver transistors M5-M8 in wireless power converter 120 may operate in a balanced or unbalance mode. In a balanced mode, output driver transistors M5-M8 may be driven by gate signals V5-V8, which may be non-overlapping pulse-width modulated signals. These signals may generate an opening current in power transfer coil L3, which may be capacitively coupled through capacitors C1 and C2 to the output driver transistors M5-M8. In the unbalanced mode of operation, either pair of output driver transistors, M5 and M6, or M7 and M8, may be driven while the other pair may form a path to ground. For example, output drive transistors M5 and M6 may be driven by signals V5 and V6, which may be non-overlapping pulse-width modulated signals. Transistor M8 may be on to form a path to ground, while transistor M7 may be off. The output of output driver transistors M5 and M6 may drive power transfer coil L3 via capacitor C1.

The current in power transfer coil L3 may induce a current in power transfer coil L4 in accessory 160. A resulting voltage may be capacitively coupled through capacitor C3 and C4 to transistors M9-M12. In this case, transistors M9-M12 may act as a rectifier to generate voltage VWA across capacitor C5. The voltage VWA may then be used to power circuitry in accessory 160.

Again, battery charger 110 and wireless power converter may include current limit and current regulation circuitry. For example, current in switch S1 may be monitored, and if it is excessive, switch S1 may be opened, thereby disconnecting POWER SOURCE 1 from battery charger 110. Similarly, current in the switch S6 may be monitored, and if excessive, switch S6 may be opened. The same may be true of switches S4 and S5. In this example, switches S1, S5, and S6 may be closed, while switches S2 and S3 may be open. Switch S4 may be closed to charge battery 150.

Again in this example, power from battery charger 110 may be provided to battery 150 as well as to wireless power converter 120. Accordingly, regulation circuitry may be included to ensure that wireless power converter 120 has sufficient power to operate properly. For example, any or all of the power converters may have configurable impedances that may be adjusted by varying the duty cycles of their gate signals such that wireless power converter 120 receives sufficient current to operate.

In a second example, wireless power may be received by an electronic device from an accessory and used to charge a battery in the electronic device. Specifically, power may be provided by one or more drivers in an accessory, which may generate an alternating current through a first wireless power transmission coil. This wireless power may be received by a second wireless power transmission coil in the electronic device. A rectifier in the wireless power converter may receive the wireless power and provide power to a buck converter in the battery charger. The buck converter may provide power to the battery and the system.

Figure 10:
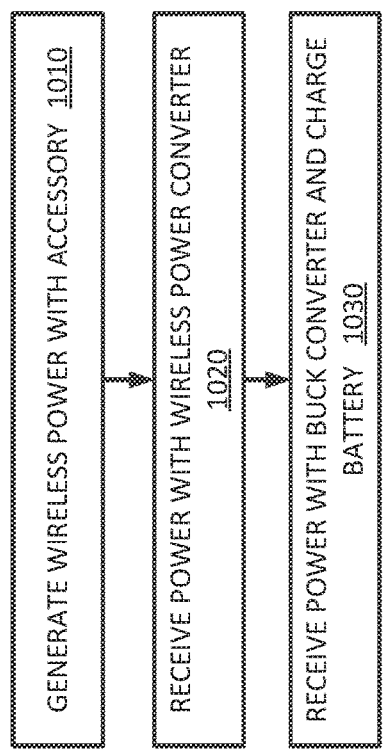
FIG. 10 is a flow chart showing a second example of power transfer according to an embodiment of the present invention.

FIG. 10 is a flow chart showing the second example of power transfer according to an embodiment of the present invention. In act 1010, wireless power may be generated by an accessory. This power may be received by a wireless power converter in an electronic device in act 1020. Power from the wireless power converter may be received by a buck converter in a battery charger and used to charge a battery in act 1030. Current may also be provided to the system in the electronic device.

Figure 11:
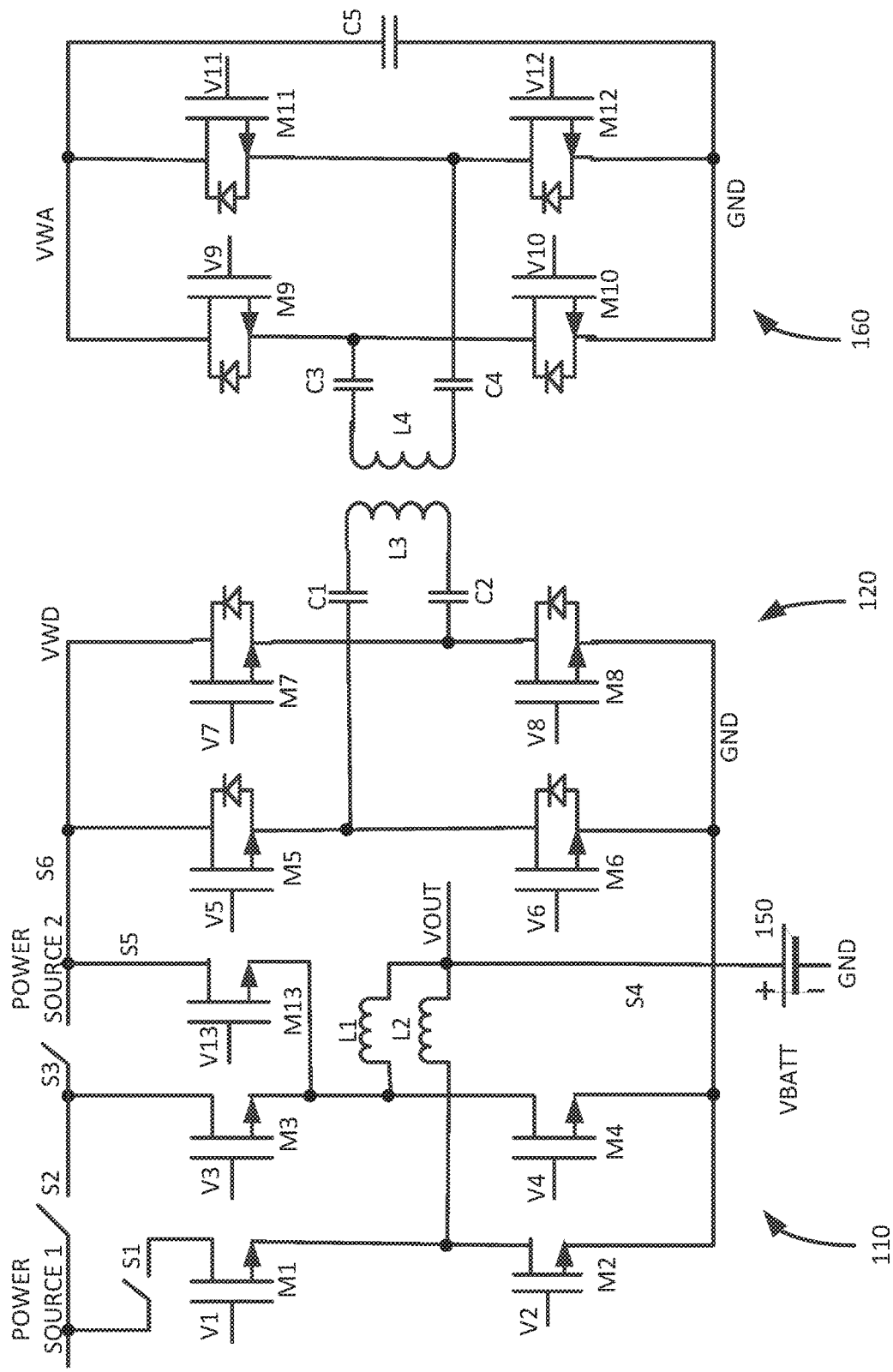
FIG. 11 is a simplified schematic of a power transfer system configured for the second example according to an embodiment of the present invention.

FIG. 11 is a simplified schematic of a power transfer system configured for the second example according to an embodiment of the present invention. In this example, a voltage VWA may be generated in accessory 160. Transistors M9-M12 may operate in a balanced or unbalanced mode. In the balanced mode, transistors M9-M12 may be driven by non-overlapping pulse-width modulated signals V9-V12 to generate an alternating current in power transfer coil L4. In the unbalanced mode of operation, either pair of output driver transistors, M9 and M10, or M11 and M12, may be driven while the other pair may form a path to ground. For example, output driver transistors M9 and M10 may be driven by signals V9 and V10, which may be non-overlapping pulse-width modulated signals. Transistor M12 may be on to form a path to ground, while transistor M11 may be off. The output of driver transistors M9 and M10 may drive power transfer coil L4 via capacitor C3. The alternating current in power transfer coil L4 may induce a current in power transfer coil L3, which may be coupled to transistors M5-M8. Transistors M5-M8 may form a rectifier, which may generate a voltage VWD. The voltage VWD may be applied through closed switches S5 and S6 to node POWER SOURCE 2, which may provide power to a buck converter comprising M13, M4, and inductor L1. In these and other embodiments of the present invention, node POWER SOURCE 2 may receive power from a connector, such as a USB Type-C, USB Type-A, lightning, or other wired connection. Signals V4 and V13 at the gates of transistors M4 and M13 may be non-overlapping pulse-width modulated signals to generate currents in inductor L1, though transistor M4 may be off. Transistor M3 may also be off, though M3 may be configured to operate the same as M13 and switch S3 may be closed. The output of this converter may provide charge for battery 150 and power for system 130, as shown in FIG. 1. In this example, switches S2 and S3 may also close, thereby providing power to the buck converter of M1, M2, and inductor L2. This additional converter may then also to charge battery 150 and provide power to system 130, as shown in FIG. 1. This may provide an additional charging path when the received wireless power is at a high wattage.

In this example, current limiting circuitry may protect battery 150 from excessive charge. For example, current may be monitored and any or all of switches S4, S5, and S6, and any or all of these switches may be opened if excess current is detected. In this example, switches S5 and S6 may be closed, while switches S1, S2, and S3 may be open. Switch S4 may be closed to charge battery 150.

In a third example, power may be received from a host or other electronic device or charger, and used to charge a battery and provide power to the system in an electronic device. Specifically, power may be received at a connector of the electronic device from a host or other electronic device or charger. This power may be received by a buck or other power converter in the battery charger. More specifically, in these and other embodiments of the present invention, the battery charger may include a two-phase buck or other type of converter, and this buck or other converter may convert the received power and provide it to the battery and system for a fast charging.

Figure 12:
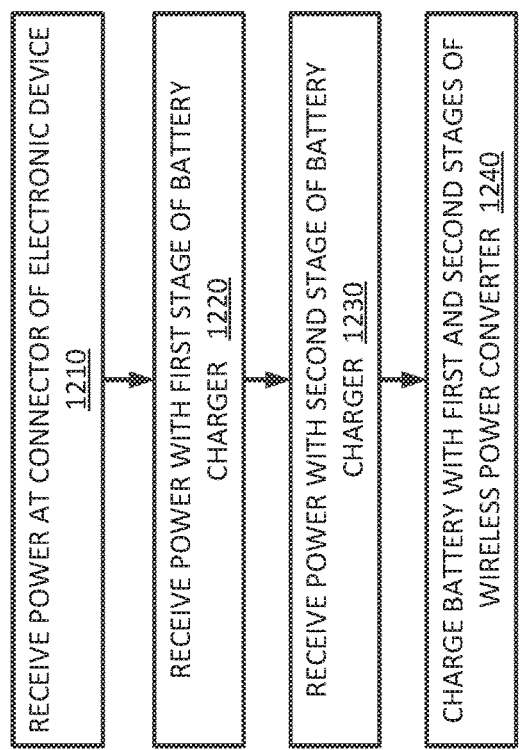
FIG. 12 is a flow chart showing a third example of power transfer according to an embodiment of the present invention.

FIG. 12 is a flow chart showing the third example of power transfer according to an embodiment of the present invention. In act 1210, power may be received at a connector of an electronic device. This power may be received with a first stage of the battery charger in act 1220. The power received at the connector may also be provided to a second stage of the battery charger in act 1230. In act 1240, a battery in the electronic device may be charged using the first and second stages of the wireless power converter. The first and second stages may be buck converters or other types of power converters.

Figure 13:
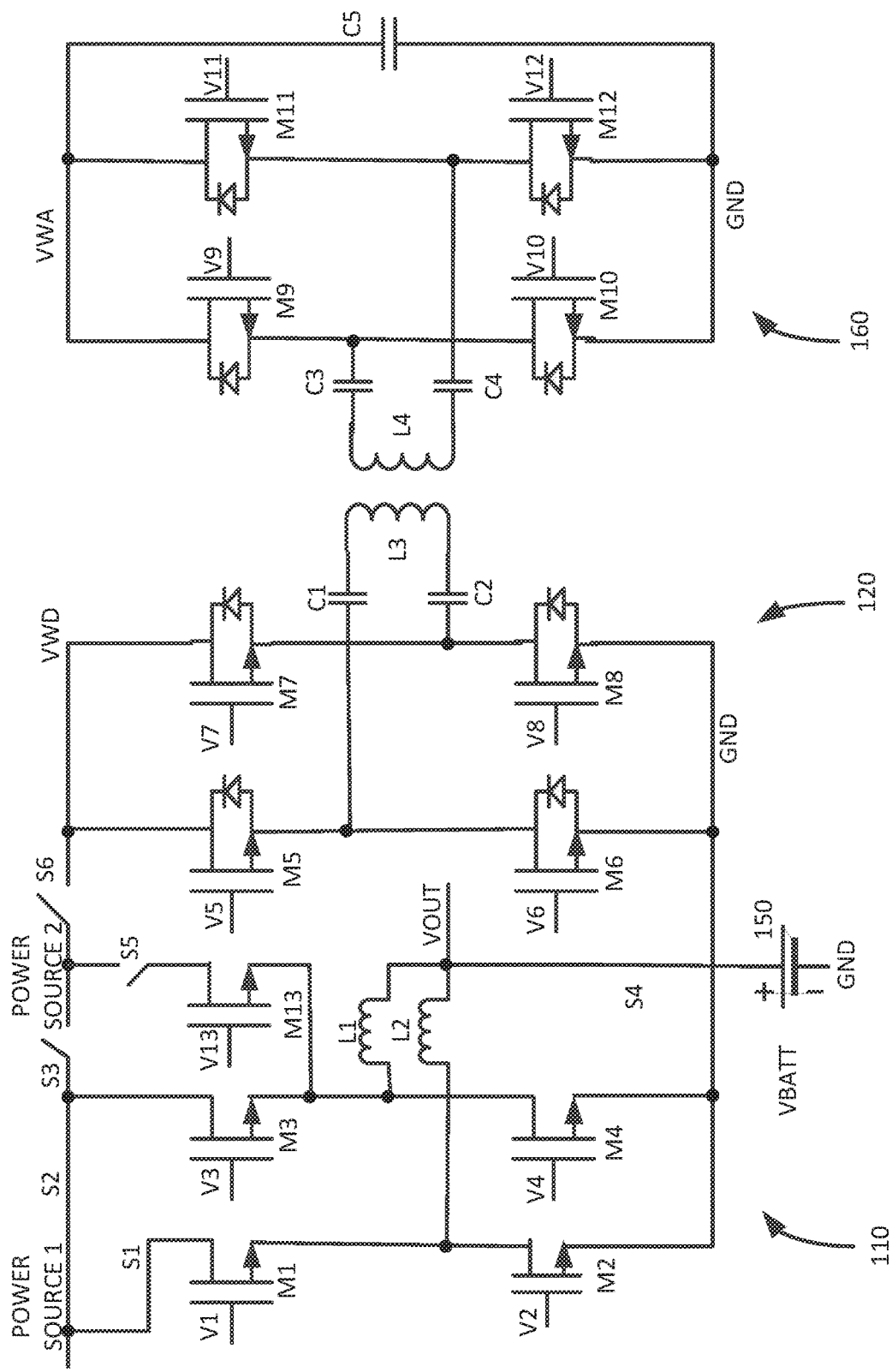
FIG. 13 is a simplified schematic of a power transfer system configured for the third example according to an embodiment of the present invention.

FIG. 13 is a simplified schematic of a power transfer system configured for the third example according to an embodiment of the present invention. In this example, switches S1 and S2 may both be closed providing voltage on POWER SOURCE 1 from connector 112 or other wired connection of electronic device 100 to driver transistors M1-M4, which may form first and second buck converters. Connector 112 may be a USB Type-C, USB Type-A, lightning, or other type of connector. In these and other embodiments of the present invention, POWER SOURCE 1 may instead be received from a wireless power converter or other wireless power source. Transistors M1-M4 may be driven by non-overlapping pulse-width modulated signals V1-V4, though transistors M2 and M4 may be off and transistor M13 may be connected to operate in parallel with transistor M3. The drivers may provide currents through inductors L1 and L2 to generate VOUT, which may be used to power system 130, as shown in FIG. 1. Switch S4 may also close thereby allowing the driver transistors M1-M4 to charge battery 150. In this example, two buck converters may be used to charge battery 150 and provide power to system 130 for fast charging. In such a situation, power received at wireless power converter 120 may be ignored by electronic device 100. This configuration may be particularly useful where a high voltage, such as 9 or 15 volts, is received at connector 112 of electronic device 100, as shown in FIG. 1.

In this example, current limiting circuitry may protect battery 150 from excessive charge. For example, current may be monitored and any or all of switches S1, S2, and S4, and any or all of these switches may be opened if excess current is detected. In this example, switches S1 and S2 may be closed, while switches S3, S5, and S6 may be open. Switch S4 may be closed to charge battery 150.

In a fourth example, power may be provide by a battery of an electronic device and used to provide wireless power to an accessory. Specifically, power may be received from the battery by a boost or other converter in the battery charger. The boost converter may provide power to a wireless power converter. One or more drivers in the wireless power converter may generate an alternating current through a first wireless power transmission coil. This wireless power may be received by a second wireless power transmission coil in an accessory. A rectifier across the wireless power transmission coil in the accessory may receive the wireless power and provide power to the accessory.

Figure 14:
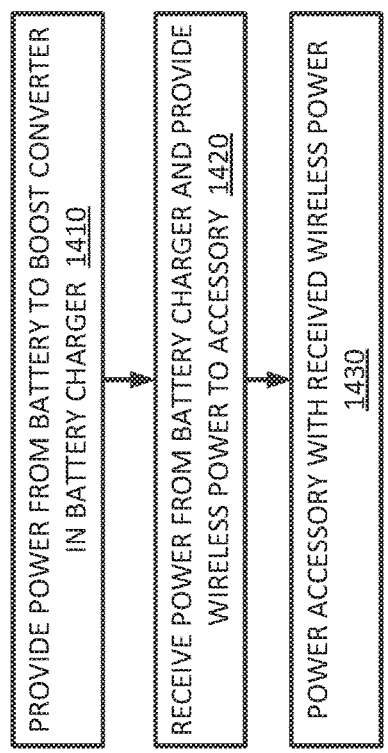
FIG. 14 is a flow chart showing a fourth example of power transfer according to an embodiment of the present invention.

FIG. 14 is a flow chart showing the fourth example of power transfer according to an embodiment of the present invention. In this example, power may be provided from a battery to a boost or other converter in a battery charger. Power may be provided from the boost converter to a wireless power converter in act 1410. The wireless power may be provided from the wireless power converter to an accessory in act 1420. The accessory may be powered the received wireless power in act 1430.

Figure 15:
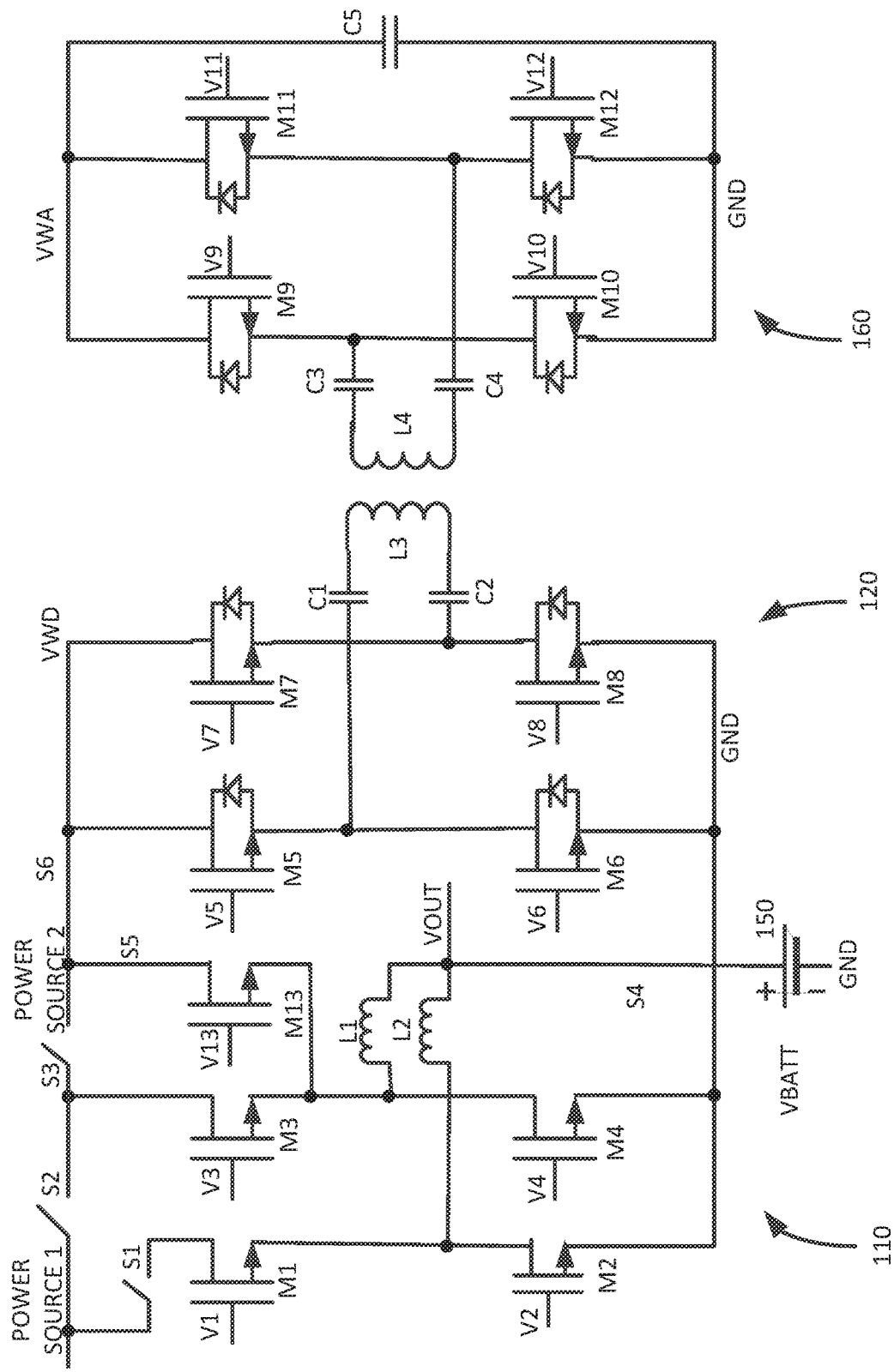
FIG. 15 is a simplified schematic of a power transfer system configured for the fourth example according to an embodiment of the present invention.

FIG. 15 is a simplified schematic of a power transfer system configured for the fourth example according to an embodiment of the present invention. In this example, switch S4 may be closed, thereby providing power from battery 150 to a boost converter comprising transistors M13 and M4, along with inductor L1 Signals V4 and V13 at the gates of transistors M4 and M13 may be non-overlapping pulse-width modulated signals to generate currents in inductor L1, though transistor M13 may be off. Transistor M3 may also be off, though M3 may be configured to operate the same as M13 and switch S3 may be closed. Power from the boost converter may be provided to wireless power converter 120 via closed switch S5 and node POWER SOURCE 2, though in other embodiments of the present invention, this power may be provided to a connector, such as a USB Type-C, USB Type-A, lightning, or other wired connection. As before, transistors M5-M8 may operate in a balanced or unbalanced mode. In a balanced mode, transistors M5-M8 may be driven by non-overlapping pulse-width modulated signals V5-V8 to generate an alternating current in power transfer coil L3. In the unbalanced mode of operation, either pair of output driver transistors, M5 and M6, or M7 and M8, may be driven while the other pair may form a path to ground. For example, output drive transistors M5 and M6 may be driven by signals V5 and V6, which may be non-overlapping pulse-width modulated signals. Transistor M8 may be on to form a path to ground, while transistor M7 may be off. The output of output driver transistors M5 and M6 may drive power transfer coil L3 via capacitor C1. The alternating current in power transfer coil L3 may induce a current in power transfer coil L4 in accessory 160. Transistors M9-M12 may be off, and this induced current may generate voltage VWA across the rectifier formed by transistors M9-M12. The resulting voltage VWA may be used to power accessory 160. In this example, switches S1, S2, and S3 may also close, thereby providing power from the battery to the boost converter of M1, M2, and inductor L2. This additional power converter may then also provide power from battery 150 to wireless power converter 120. This may provide an additional charging path when the received wireless power is at a high wattage.

In this example, current limiting circuitry may protect battery 150 from excessive charge. For example, current may be monitored in any of all of switches S4, S6, and S5, and any or all of these switches may be opened if excess current is detected. In this example, switches S5 and S6 may be closed, while switches S1, S2, and S3 may be open. Switch S4 may be closed to charge battery 150.

In a fifth example, power received at a connector of an electronic device may be used to provide power to a battery and system of the electronic device. Power may also be provided wirelessly from the electronic device to an accessory. Specifically, power may be received at a connector of the electronic device from a host or other electronic device or charger. This power may be provided to a two-phase buck or other power converter in the battery charger. The output power from the buck converter may be provided to the battery and system. Power from the connector may also be provided to a wireless power converter. This power may be provided to the wireless power converter through a bypass path that connects the connector of the electronic device to the wireless power converter. One or more drivers in the wireless power converter may generate an alternating current through a first wireless power transmission coil. This wireless power may be received by a second wireless power transmission coil in an accessory. A rectifier across the coil may receive the wireless power and provide power to the accessory.

Figure 16:
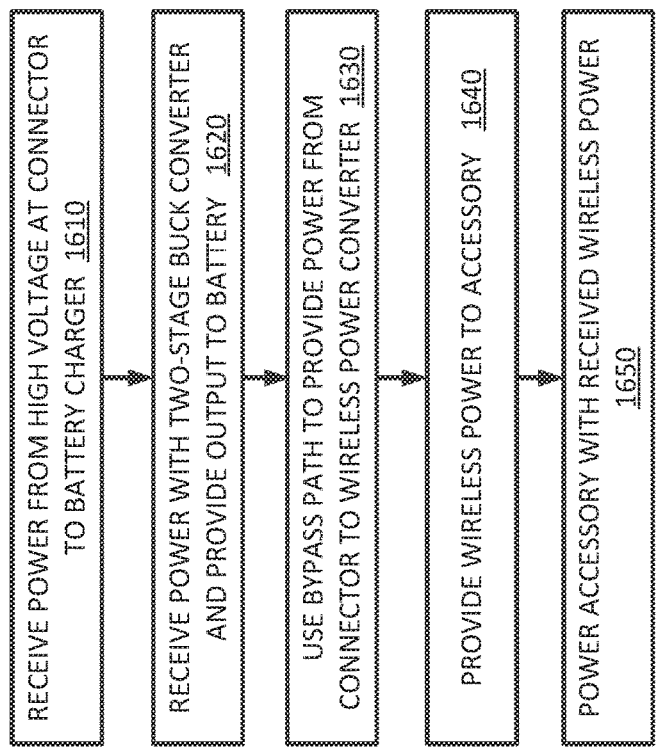
FIG. 16 is a flow chart showing a fifth example of power transfer according to an embodiment of the present invention.

FIG. 16 is a flow chart showing the fifth example of power transfer according to an embodiment of the present invention. Power may be received from a connector of the electronic device in act 1610. This power may be received by a two-phase buck converter in the battery charger, the output of which may be provided to a battery in act 1620. Power from the connector may also be provided using a bypass path to the wireless power converter in act 1630. Power generated by the wireless power converter may be provided to an accessory in act 1640. Power received by the accessory may be used to power the accessory in act 1650.

Figure 17:
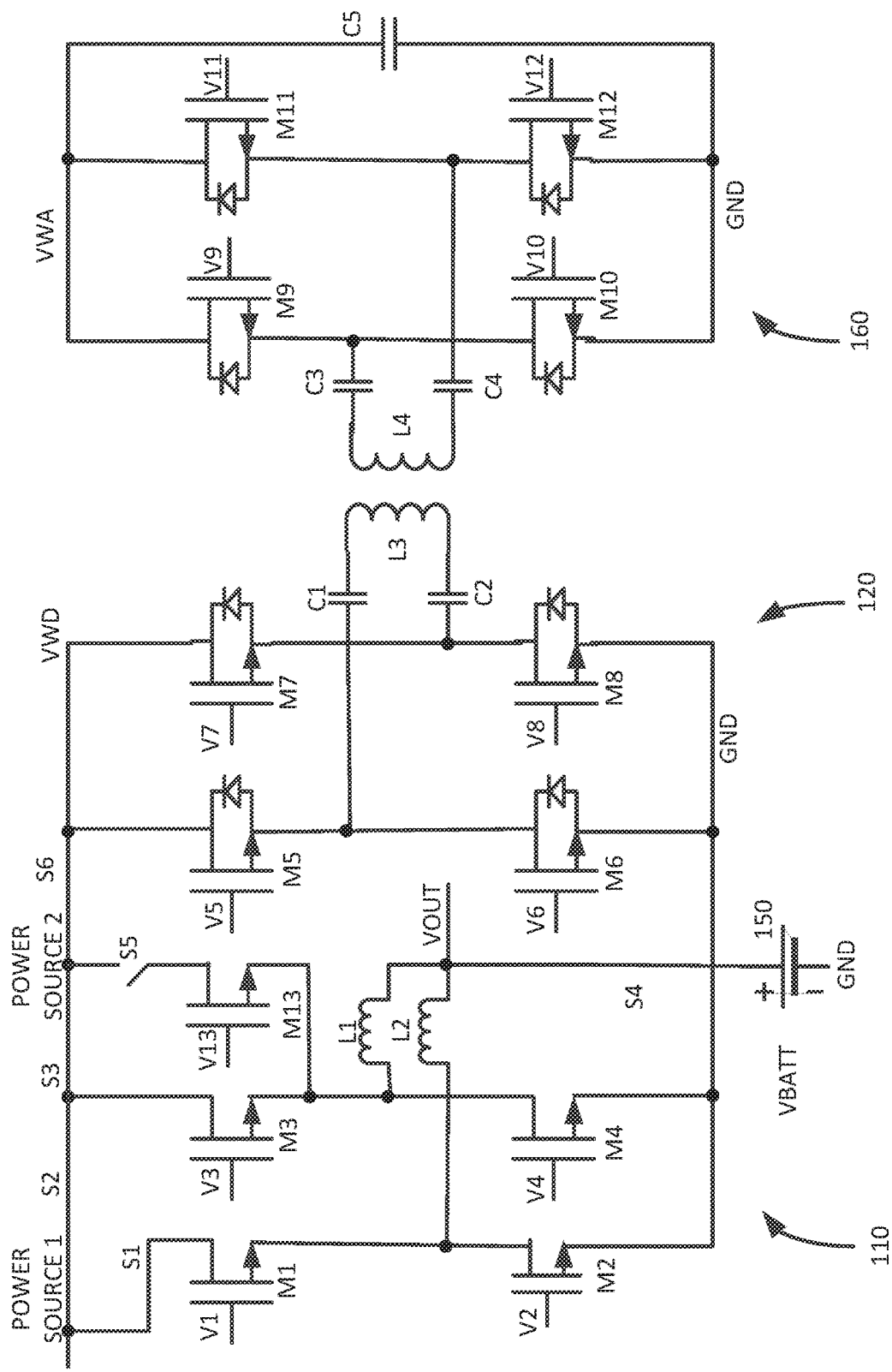
FIG. 17 is a simplified schematic of a power transfer system configured for the fifth example according to an embodiment of the present invention.

FIG. 17 is a simplified schematic of a power transfer system configured for the fifth example according to an embodiment of the present invention. In this example, power may be received from a connector 112 or other wired connection of electronic device 100, though power may instead be received from a wireless power converter or other wireless source in these and other embodiments of the present invention. Connector 112 may be a USB Type-C, USB Type-A, lightning, or other type of connector. Specifically, the voltage on POWER SOURCE 1 may be a high voltage, for example 9 or 15 volts. Switches S1 and S2 may close, thereby providing power on POWER SOURCE 1 to a two-phase buck converter comprising transistors M1, M2, M13, and M4, and inductors L1 and L2. Signals V1-V4 at the gates of transistors M1-M4 may be non-overlapping pulse-width modulated signals to generate currents in inductors L1 and L2, though transistors M2 and M4 may be off. Transistor M13 may also be off, though M13 may be configured to operate the same as M3 and switch S5 may be closed. Using an additional power converter stage may provide an extra 5 watts of power to charge the battery, though this may vary depending on exact circuit implementation. Switches S2, S3, and S6 may be closed, thereby providing the voltage on POWER SOURCE 1 to POWER SOURCE 2 and VWD. The voltage VWD may be used to power driver transistors M5-M8 in wireless power converter 120, though in these and other embodiments of the present invention VWD may instead provide power to a connector, such as a USB Type-C, USB Type-A, lightning, or other wired connection. Wireless power converter 120 may operate in a balanced or unbalanced mode. In the balanced mode of operation, transistors M5-M8 may be driven by non-overlapping pulse-width modulated signals V5-V8 to generate an alternating current in power transfer coil L3. In the unbalanced mode of operation, either pair of output driver transistors, M5 and M6, or M7 and M8, may be driven while the other pair may form a path to ground. For example, output drive transistors M5 and M6 may be driven by signals V5 and V6, which may be non-overlapping pulse-width modulated signals. Transistor M8 may be on to form a path to ground, while transistor M7 may be off. The output of output driver transistors M5 and M6 may drive power transfer coil L3 via capacitor C1. The alternating current in power transfer coil L3 may induce an alternating current in power transfer coil L4 in accessory 160, which may be rectified by a rectifier formed of transistors M9-M12 in accessory 160 to generate voltage VWA. The voltage VWA may be used to power accessory 160.

Again, additional current limitation circuitry may be included. For example, a current in any or all of switches S1, S2, S3, S4, and S6 may be monitored, and any of all of these switches may be opened in the event of excessive current.

Again, additional current regulation circuitry may also be included. For example, any or all of the power converters may include current monitoring circuitry. The impedances of any or all of the power converters may be adjusted by varying the duty cycles of their gate signals to ensure that wireless power converter 120 receives sufficient current to operate. In this example, switches S1, S2, S3, and S6 may be closed, while switch S5 may be open. Switch S4 may be closed to allow charging of battery 150.

In a sixth example, both wired and wireless power may be received by an electronic device and used to charge a battery and provide power to the system of the electronic device. Specifically, power may be received at a connector of the electronic device from a host or other electronic device or charger. This power may be received by a buck or other power converter in the battery charger. The output power of the buck converter may be provided to the battery and system. At the same time, power may be provided by one or more drivers in an accessory, which may generate an alternating current through a first wireless power transmission coil. This wireless power may be received by a second wireless power transmission coil in the electronic device. A rectifier in the wireless power converter may receive the wireless power and provide power a second buck converter, which may also provide power to the battery and the system. This combined current from wired and wireless sources may speed the rate of charging of the battery.

Figure 18:
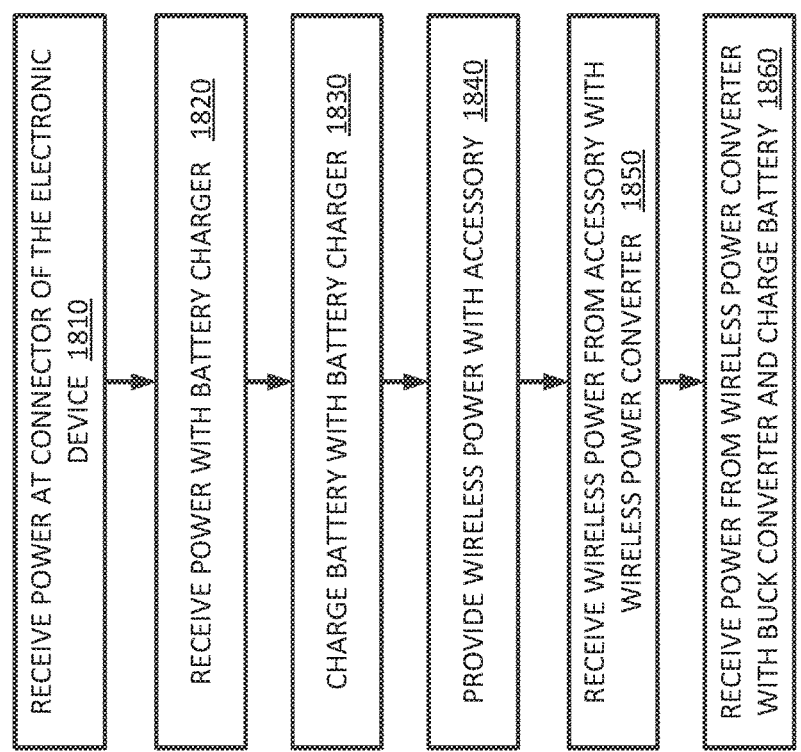
FIG. 18 is a flow chart showing a sixth example of power transfer according to an embodiment of the present invention.

FIG. 18 is a flow chart showing the sixth example of power transfer according to an embodiment of the present invention. In act 1810, power may be received at a connector of an electronic device. This power may be received by a buck converter in the battery charger in act 1820. The battery may be charged with the output of the buck converter in act 1830. At the same time, wireless power may be generated by an accessory in act 1840. This wireless power may be received from an accessory by a wireless power converter in the electronic device in act 1850. Power from the wireless power converter may be received by a buck converter and the battery may be charged with its output in act 1860.

Figure 19:
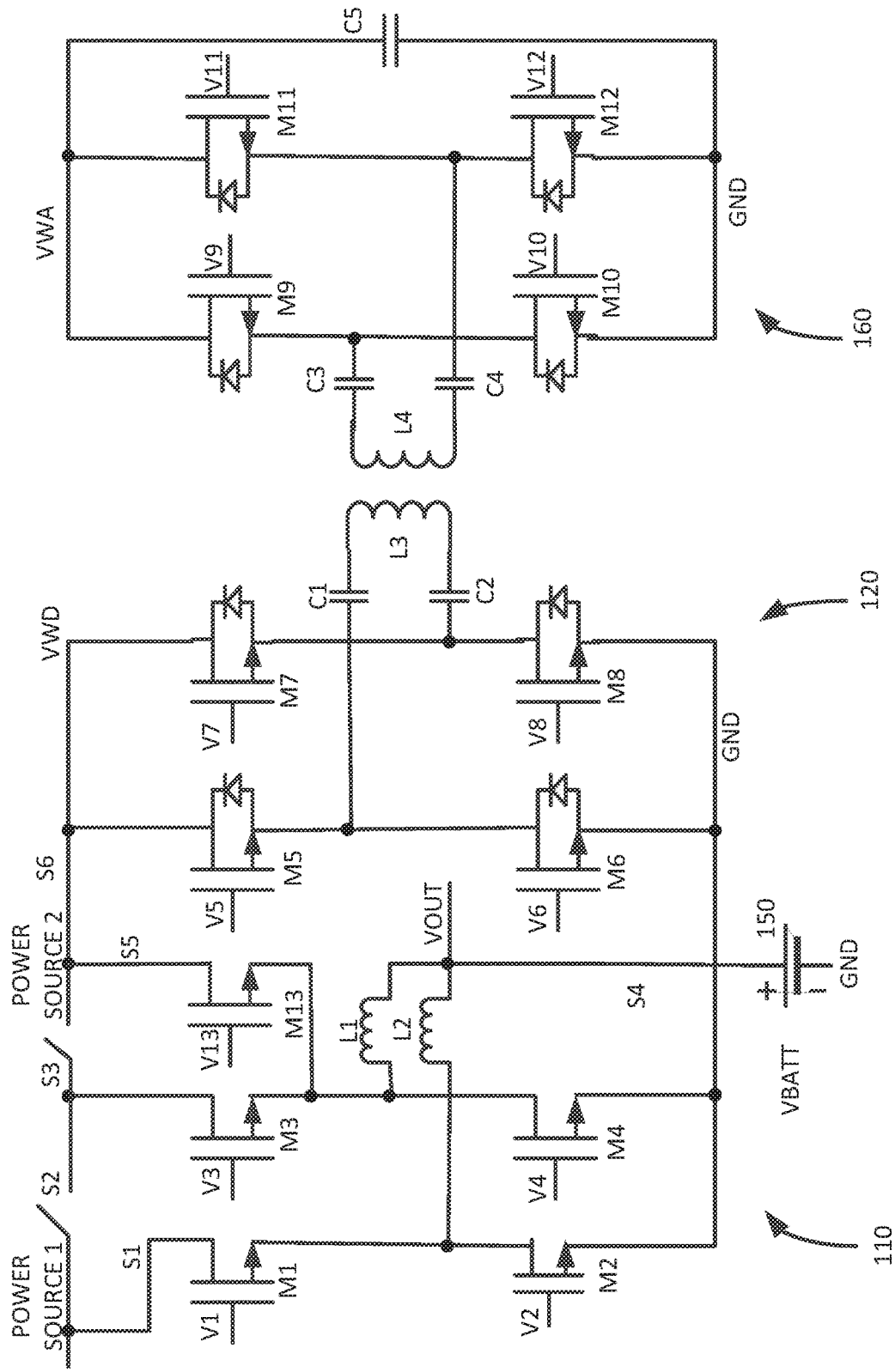
FIG. 19 is a simplified schematic of a power transfer system configured for the sixth example according to an embodiment of the present invention.

FIG. 19 is a simplified schematic of a power transfer system configured for the sixth example according to an embodiment of the present invention. In this configuration, power may be received at POWER SOURCE 1, which may be connected to a pin or contact of a connector 112 or other wired connection of electronic device 100. Connector 112 may be a USB Type-C, USB Type-A, lightning, or other type of connector. Power at the connector may be from a host device, charger, or other electronic device. In these and other embodiments of the present invention, POWER SOURCE 1 may instead be received from a wireless power converter or other wireless power source. POWER SOURCE 1 may be provided to transistors M1 and M2, which may be power converter transistors of a buck or other type of power converter. Signals V1 and V2 at the gates of transistors M1 and M2 may be non-overlapping pulse-width modulated signals (though M2 may be off) to generate currents in inductor L2. The output voltage VOUT may be used to charge battery 150 and power system 130 as shown in FIG. 1. At the same time, a voltage VWA may be generated in accessory 160. Transistors M9-M12 may operate in a balanced or unbalanced mode of operation. In the balanced mode, transistors M9-M12 may be driven by non-overlapping pulse-width modulated signals V9-V12 to generate an alternating current in power transfer coil L4 via capacitors C3 and C4. In the unbalanced mode of operation, either pair of output driver transistors, M9 and M10, or M11 and M12, may be driven while the other pair may form a path to ground. For example, output driver transistors M9 and M10 may be driven by signals V9 and V10, which may be non-overlapping pulse-width modulated signals. Transistor M12 may be on to form a path to ground, while transistor M11 may be off. The output of output driver transistors M9 and M10 may drive power transfer coil L4 via capacitor C3. The alternating current in power transfer coil L4 may induce a current in power transfer coil L3, which may be coupled to transistors M5-M8. Transistors M5-M8 may form a rectifier, which may generate a voltage VWD, which may be provided to node POWER SOURCE 2. In these and other embodiments of the present invention, POWER SOURCE 2 may instead receive power from a connector, such as a USB Type-C, USB Type-A, lightning, or other wired source. The voltage VWD may be applied through closed switches S6 and S3 to power the buck converter comprising transistors M13 and M4, and inductor L1. Signals V4 and V13 at the gates of transistors M4 and M13 may be non-overlapping pulse-width modulated signals to generate currents in inductor L1, though transistor M4 may be off. Transistor M3 may also be off (though M3 may be configured to operate the same as M13 and switch S3 may be closed.) The output of this second buck converter may provide charge for battery 150 and power for system 130, as shown in FIG. 1.

In this example, current limiting circuitry may protect battery 150 from excessive charge. For example, current may be monitored and any or all of switches S1, S4, S5, and S6, and any or of these switches may be opened if excess current is detected. In this example, switches S1, S5, and S6 may be closed, while switches S2 and S3 may be open. Switch S4 may be closed to allow battery 150 to be charged.

In a seventh example, wireless power may be received from an accessory and wired power may be provided over a connector of an electronic device. Specifically, power may be provided by one or more drivers in a first accessory, which may generate an alternating current through a first wireless power transmission coil. This wireless power may be received by a second wireless power transmission coil in the electronic device. A rectifier in the wireless power converter may receive the wireless power and provide this power to a buck converter in a battery charger. The output of the buck converter may be used to charge a battery and to provide power to system. Power may also be received from the battery and provided to a boost converter in the battery charger. The output of the boost converter may provide power to a connector of the electronic device. Power may then be received from the connector by a second accessory.

Figure 20:
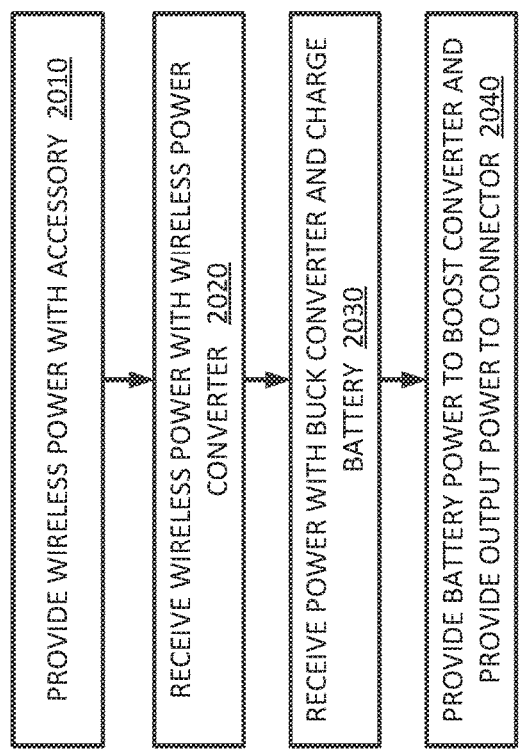
FIG. 20 is a flow chart showing a seventh example of power transfer according to an embodiment of the present invention.

FIG. 20 is a flow chart showing the seventh example of power transfer according to an embodiment of the present invention. Wireless power may be provided by a first accessory in act 2010. The wireless power may be received with a wireless power converter in an electronic device in act 2020. This power may in turn be received by a buck converter in a battery charger. A battery in the electronic device may be charged with the output power of the buck converter in act 2030. The power from the battery may be provided to a boost converter in the battery charger, which may provide power to a connector of the electronic device in act 2040, where it may be received by a second accessory or host or other electronic device.

Figure 21:
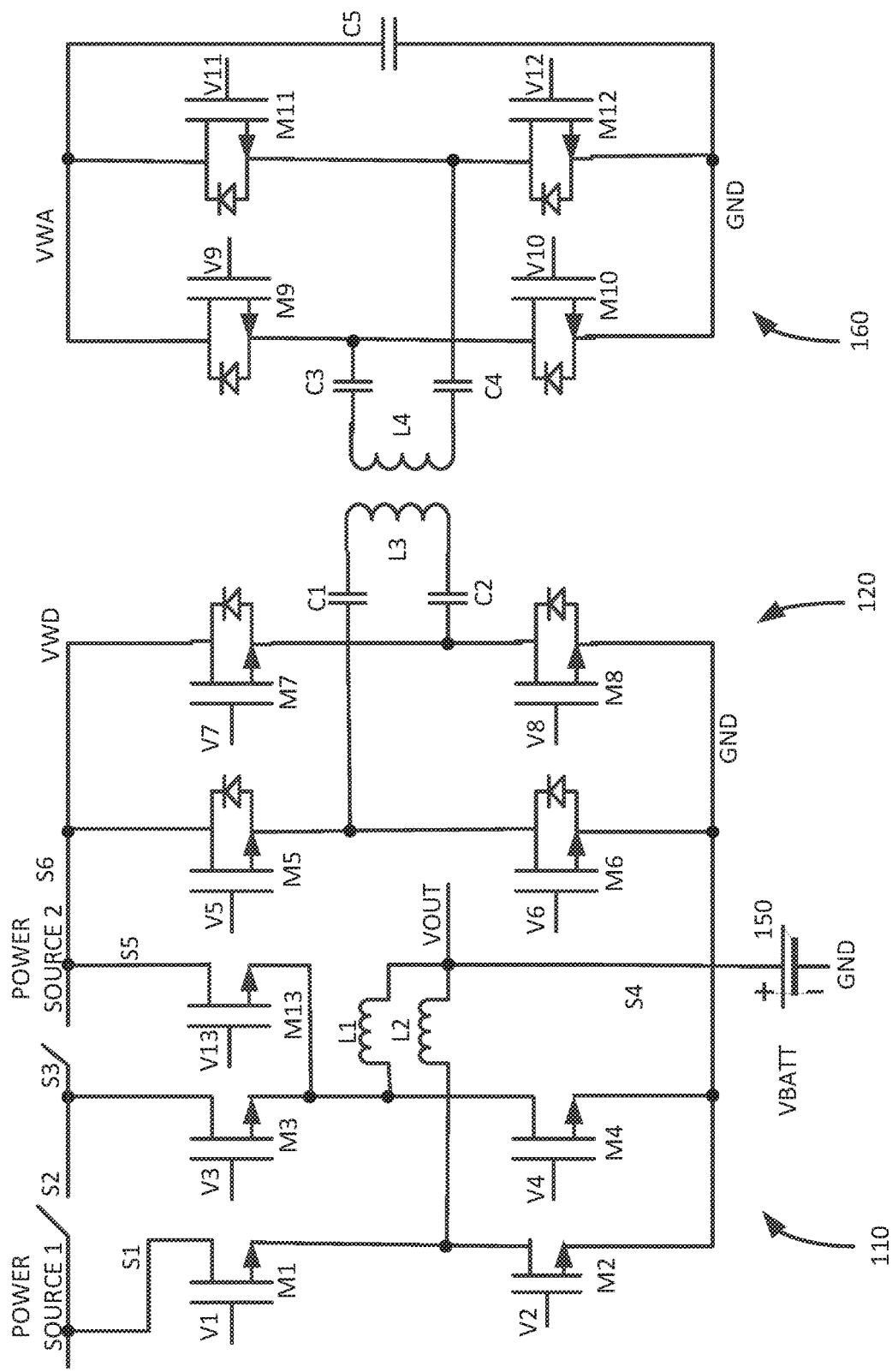
FIG. 21 is a simplified schematic of a power transfer system configured for the seventh example according to an embodiment of the present invention.

FIG. 21 is a simplified schematic of a power transfer system configured for the seventh example according to an embodiment of the present invention. A voltage VWA may be generated in accessory 160. Transistors M9-M12 may operate in a balanced or unbalanced mode. In the balanced mode, transistors M9-M12 may be driven by non-overlapping pulse-width modulated signals V9-V12 to generate an alternating current in power transfer coil L4 via capacitors C3 and C4. In the unbalanced mode of operation, either pair of output driver transistors, M9 and M10, or M11 and M12, may be driven while the other pair may form a path to ground. For example, output driver transistors M9 and M10 may be driven by signals V9 and V10, which may be non-overlapping pulse-width modulated signals. Transistor M12 may be on to form a path to ground, while transistor M11 may be off. The output of output driver transistors M9 and M10 may drive power transfer coil L4 via capacitor C3. The alternating current in power transfer coil L4 may induce a current in power transfer coil L3, which may be coupled to transistors M5-M8 in wireless power converter 120 of electronic device 100. Transistors M5-M8 may form a rectifier, which may generate a voltage VWD. The voltage VWD may be coupled to POWER SOURCE 2 via closed switch S6. In these and other embodiments of the present invention, POWER SOURCE 2 may instead receive power from a connector, such as a USB Type-C, USB Type-A, lightning, or other wired connection. POWER SOURCE 2 may be applied through closed switch S5 to a buck converter comprising transistors M13 and M4, as well as inductor L1, the output of which may provide charge for battery 150 and power for system 130, as shown in FIG. 1. Signals V4 and V13 at the gates of transistors M4 and M13 may be non-overlapping pulse-width modulated signals to generate currents in inductor L1, though transistor M4 may be off. Transistor M3 may also be off, though M3 may be configured to operate the same as M13 and switch S3 may be closed. Power from the battery may be provided through switch S4 to a boost converter including transistors M1 and M2, and inductor L2. Signals V1 and V2 at the gates of transistors M1 and M2 may be non-overlapping pulse-width modulated signals to generate currents in inductor L1, though transistor M1 may be off. This boost converter may provide power to POWER SOURCE 1, which may be connected to a pin or contact of connector 112 or other wired connection of electronic device 100. Connector 112 may be a USB Type-C, USB Type-A, lightning, or other type of connector. Power may be received from connector 112 by a second accessory or host or other electronic device, though in these and other embodiments of the present invention, power may instead be provided to a wireless power converter or other wireless power receiver. Also in this example, power may be routed using the bypass path of S2 and S3, thereby providing power from wireless power converter 120 to connector 112 or wireless power converter 120.

Again, additional current limitation circuitry may be included. For example, a current in any or all of switches S1, S4, S5, and S6 may be monitored, and any or all of these switches may be opened in the event of excessive current.

Again, additional current regulation circuitry may also be included. For example, any or all of the power converters may include current monitoring circuitry. The impedances of any or all of these power converters may be adjusted by varying the duty cycles of their gate signals to ensure that wireless power converter 120 receives sufficient current to operate. In this example, switches S1, S5, and S6 may be closed, while switches S2 and S3 may be open. Switch S4 may be closed to allow charging of battery 150.

These and other embodiments of the present invention may not support each and every one of the configurations disclosed herein. That is, these and other embodiments of the present invention may provide a subset of these features. Also, in these and other embodiments of the present invention, other power transfer configurations may be possible. For example, power may be provided from battery 150 to connector 112 through either or both battery charger 110 and bypass path 140. Power may also be provided from battery 150 to both connector 112 and wireless power converter 120.

Battery charger 110, wireless power converter 120, and bypass path 140 may be configured for these various operations in different ways. For example, one or more connector or orientation detection contacts may be used to determine when an external host or other electronic device or charger is connected to the battery charger via connector 112. These connector or orientation detection contacts may be coupled to circuitry (not shown) that may be used to determine whether a connected device should provide power to one or more of system 130, battery 150, or wireless power converter 120, or whether the connected device should receive power from one or more of these sources. Circuitry connected to wireless power converter 120 may determine when an external accessory or charger is inductively connected to wireless power converter 120. This circuitry may further determine whether an inductively connected device should provide power to one or more of system 130, battery 150, or battery charger 110, or whether the inductively connected device should receive power from one or more of these sources. Circuitry connected to bypass path 140 may determine whether a power supply received at connector 112 is sufficient to directly power wireless power converter 120 and may connect these circuits accordingly. This circuitry may also determine whether wireless power converter 120 may provide power to connector 112, and may connect these circuits accordingly.

Embodiments of the present invention may provide charging circuitry that may be located in various types of devices, such as portable computing devices, tablet computers, desktop computers, laptops, all-in-one computers, wearable computing devices, cellular phones, smart phones, media phones, storage devices, portable media players, navigation systems, monitors, power supplies, adapters, remote control devices, chargers, and other devices.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:
   a connector;
   a battery charger coupled to the connector, a battery, and a system, wherein the system comprises circuitry of the electronic device;
   a wireless power converter coupled to the battery charger; and
   a bypass path coupled between the connector and the wireless power converter to bypass the battery charger,
   wherein when a voltage received at the connector is determined to be above a first threshold, the bypass path selectively provides power from the connector to the wireless power converter, otherwise the battery charger selectively provides power from the connector to the wireless power converter.

2. The electronic device of claim 1 wherein the battery charger selectively receives power from the connector and selectively provides power to one or more of the system, the battery, and the wireless power converter.

3. The electronic device of claim 2 wherein the battery charger selectively receives power from one or more of the battery and the wireless power converter and selectively provides power to the connector.

4. The electronic device of claim 3 wherein the wireless power converter selectively receives power from an accessory and selectively provides power to one or more of the system, the battery, and the battery charger.

5. The electronic device of claim 4 wherein the wireless power converter selectively receives power from one or more of the battery and the battery charger and selectively provides power to the accessory.

6. The electronic device of claim 1 wherein the connector is a Universal Serial Bus (USB) Type-C connector.

7. The electronic device of claim 1 wherein the connector is a Lightning® connector.

8. The electronic device of claim 1 wherein the bypass path selectively provides power from the wireless power converter to the connector.

9. An electronic device comprising:
   a battery;
   a connector;
   a wireless power transmission coil;
   a battery charger coupled between the battery and the connector, and further coupled to receive a first battery charging signal and a first battery discharging signal, wherein in response to receiving the first battery charging signal, the battery charger receives power from the connector and provides power to the battery, and wherein in response to receiving the first battery discharging signal, the battery charger receives power from the battery and provides power to the connector;
   a wireless power converter coupled between the battery and the wireless power transmission coil, and further coupled to receive a second battery charging signal and a second battery discharging signal, wherein in response to receiving the second battery charging signal, the wireless power converter receives power from the wireless power transmission coil and provides power to the battery, and wherein in response to receiving the second battery discharging signal, the wireless power converter receives power from the battery and provides power to the wireless power transmission coil; and
   a bypass path coupled between the connector and the wireless power converter, and further coupled to receive a bypass signal, wherein in response to receiving the bypass signal the bypass path transfers power between the connector and the wireless power converter,
   wherein in response to the battery charger receiving the first battery charging signal simultaneously with the wireless power converter receiving the second battery charging signal, power received from the connector and power received from the wireless power transmission coil are simultaneously provided to the battery.

10. The electronic device of claim 9 wherein the battery charger comprises a first power output stage having an input coupled to the connector and an output coupled to a first terminal of a first inductor, the first inductor having a second terminal coupled to the battery.

11. The electronic device of claim 10 wherein the wireless power converter comprises:
    a second power output stage having an input coupled to the battery and an output coupled to a first terminal of a first capacitor, the first capacitor having a second terminal coupled to a first terminal of the wireless power transmission coil; and
    a third power output stage having an input coupled to the battery and an output coupled to a first terminal of a second capacitor, the second capacitor having a second terminal coupled to a second terminal of the wireless power transmission coil.

12. The electronic device of claim 11 wherein the bypass path comprises two transistors coupled to have back-to-back body diodes.

13. The electronic device of claim 9 wherein the connector is a Universal Serial Bus (USB) Type-C connector.

14. The electronic device of claim 9 wherein the connector is a Lightning® connector.

15. An electronic device comprising:
    a battery;
    a connector;
    a wireless power transmission coil;
    a battery charger coupled between the battery and the connector, and further coupled to selectively transfer power from the connector to the battery, and to selectively transfer power from the battery to the connector;
    a wireless power converter coupled between the battery and the wireless power transmission coil, and further coupled to selectively transfer power from the wireless power transmission coil to the battery, and to selectively transfer power from the battery to the wireless power transmission coil; and
    a bypass path configured to selectively transfer power from the connector to the wireless power converter while the battery charger selectively transfers power from the connector to the battery.

16. The electronic device of claim 15 wherein the bypass path is further coupled to selectively transfer power from the wireless power converter to the connector.

17. The electronic device of claim 16 wherein each of the battery charger and the wireless power converter are further coupled to selectively transfer power to system circuitry in the electronic device.

18. The electronic device of claim 15 wherein the connector is a Universal Serial Bus (USB) Type-C connector.

19. The electronic device of claim 15 wherein the connector is a Lightning® connector.

* * * * *